(12) United States Patent
Arii

(10) Patent No.: US 6,216,473 B1
(45) Date of Patent: Apr. 17, 2001

(54) METHOD OF RECOVERING A COOLANT, APPARATUS THEREFOR, TOOL THEREFOR AND THREE-WAY VALVE FOR RECOVERING A PRESSURIZED FLUID

(76) Inventor: Tsuneo Arii, 3-25 Midorimachi, Tokuyama-Shi, Yamaguchi-Ken (JP)

( * ) Notice: Subject to any disclaimer, the term of this patent is extended or adjusted under 35 U.S.C. 154(b) by 0 days.

(21) Appl. No.: 09/229,325

(22) Filed: Jan. 13, 1999

(30) Foreign Application Priority Data

Jan. 17, 1998 (JP) .................................................. 10-020396
Dec. 31, 1998 (JP) .................................................. 10-377453

(51) Int. Cl.$^7$ .................................................. F25B 45/00
(52) U.S. Cl. .................................................. 62/77; 62/292
(58) Field of Search .................................. 62/292, 77

(56) References Cited

U.S. PATENT DOCUMENTS

| | | | |
|---|---|---|---|
| 5,027,605 | * | 7/1997 | Hardesty ................................. 62/77 |
| 5,220,810 | * | 6/1993 | Keltner ................................... 62/292 |
| 5,275,013 | * | 1/1994 | Price et al. .............................. 62/292 |
| 5,293,756 | * | 3/1994 | Nelson et al. ........................... 62/292 |
| 5,645,104 | * | 7/1997 | Baumgartner ......................... 137/318 |
| 5,699,678 | * | 12/1997 | Trigiani ................................. 62/292 |
| 5,915,402 | * | 6/1999 | Mitchell, II ............................ 137/15 |

FOREIGN PATENT DOCUMENTS 6-2995    1/1994  (JP) .
9-68292   3/1997  (JP) .

* cited by examiner

*Primary Examiner*—William Doerrler
*Assistant Examiner*—Mark Shulman
(74) *Attorney, Agent, or Firm*—Finnegan, Henderson, Farabow, Garrett & Dunner, L.L.P.

(57) ABSTRACT

A method of recovering a coolant at a low cost and highly efficiently, an apparatus therefor and a tool therefor. When an apparatus from which to recover is an automobile, the fuel remaining in the fuel tank is burned and consumed to prevent contamination to the environment.

The three-way valve unit is opened to the recovery circuit simultaneously with the connection of the coupler unit to the recovery circuit in order to avoid a sudden increase in the pressure even when the compressor does not readily come into a halt, and the pressurized fluid such as the coolant is safely recovered by the recovery circuit out of the system.

The coolant is guided into the recovery tank through the condenser utilizing gravity by driving the compressor in the apparatus from which the coolant is to be recovered, such as a car or an apparatus (refrigerator, refrigerated show case, etc.) out of service.

A socket is fitted to a plug of the coupler unit in the three-way valve box disposed in the pressurized fluid circuit such as a refrigerator circuit. Then, the socket or a sleeve which is an outer cylinder thereof is turned by about 45 to about 90 degrees. Or, the socket is pushed and pulled to turn the valve, and the pressurized fluid is safely and reliably recovered by the recovery circuit connected to the socket in an ON-OFF manner or in a proportionally controlled manner.

16 Claims, 24 Drawing Sheets

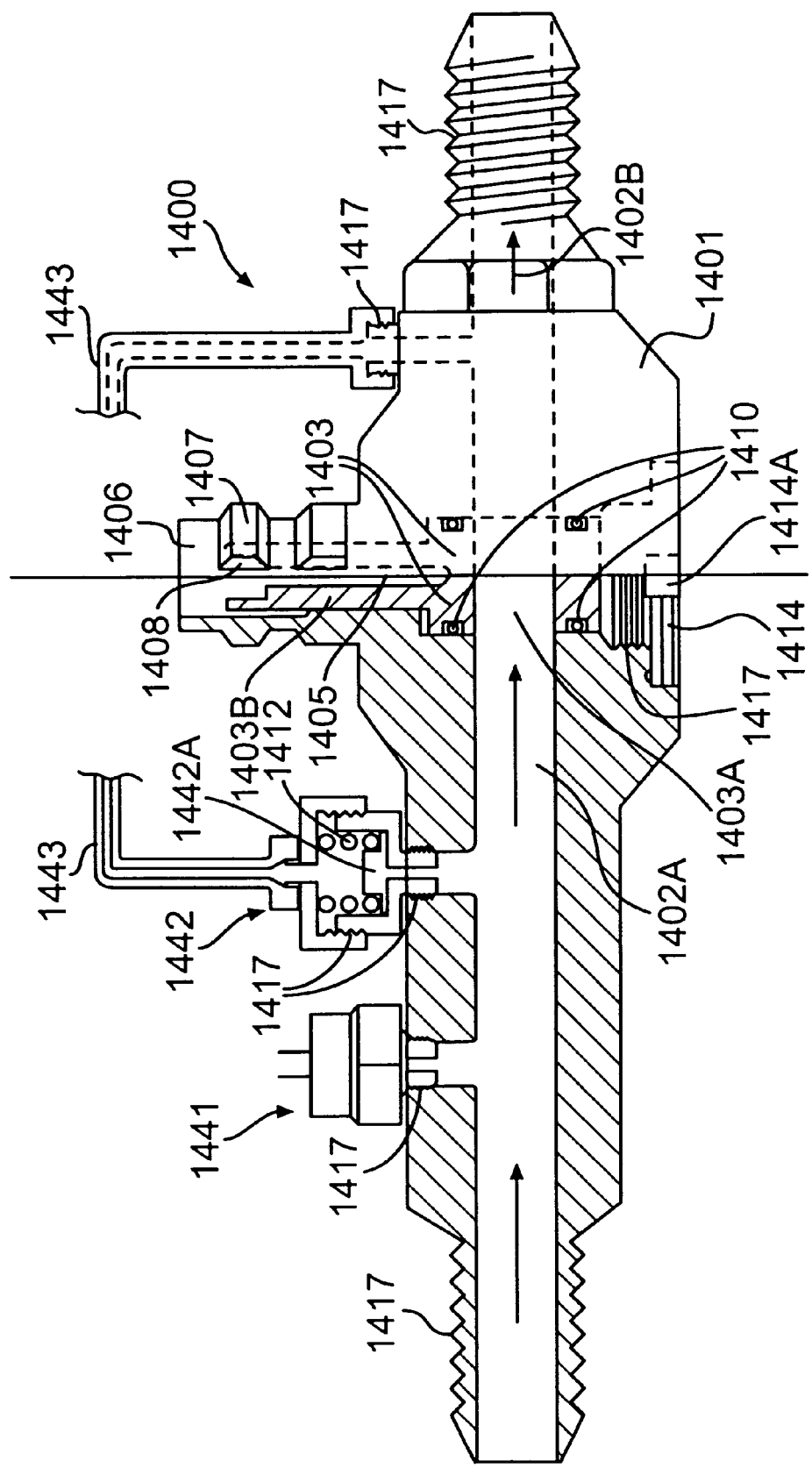

METHOD OF RECOVERING A COOLANT, APPARATUS THEREFOR, TOOL THEREFOR AND THREE-WAY VALVE FOR RECOVERING A PRESSURIZED FLUID

BACKGROUND OF THE INVENTION

1. Field of the Invention

The present invention relates to a method of recovering a coolant, to an apparatus therefor, to a tool therefor and to a three-way valve for recovering a pressurized fluid. More specifically, the invention relates to a simple method of recovering a coolant by utilizing a compressor in a refrigerator circuit such as an air conditioner of an automobile from which the coolant is to be recovered, to an apparatus therefor, as well as to a three-way valve for recovering a pressurized fluid, which opens or closes the valve unit upon manipulating a socket or a plug in a coupler unit.

2. Prior Art

Organizations such as WHO have heretofore been warning a relationship between an increase in the skin cancer and an increase in the amount of ultraviolet rays due to a decrease in the ozone layer in the polar regions.

One of the culprits can be attributed to an increased concentration of the freon gas in the atmosphere. Therefore, a strict limitation has been imposed on the release of the freon gas into the air.

Under such circumstances, it is becoming an indispensable task from an environmental point of view to recover the freon gases from the air conditioners of automobiles, from the household electric refrigerators, from the household air conditioners and from the refrigerated show cases, that have relatively short service lives.

Therefore, a variety kinds of coolant recovering devices have been placed in the market using an electric motor or an auxiliary engine as a drive source.

However, these devices are generally expensive compared to their recovering ability and have not been widely used, since people who dismantle the automobiles on business and people who dismantle the household electric appliances on business are reluctant to buy such devices.

Therefore, considerably large amounts of freon gases have presumably been released into the air though people in charge of the task may be considering it not desirable from the standpoint of environment.

To cope with these problems, a method and an apparatus for recovering freon gas have been proposed as disclosed in, for example, Japanese Unexamined Patent Publication (Kokai) No. 2995/1994. This method, however, uses a compressor that is driven by an engine of a vehicle that is going to recover the freon gas. The compressor of a vehicle from which the freon gas is to be recovered is not driven. Accordingly, fuel remaining in the vehicle from which the freon gas is to be recovered is not consumed, and the distance inevitably increases between the refrigerator circuit in the vehicle from which to recover and the compressor of the vehicle that is going to recover; i.e., the coolant is not highly efficiently recovered within short periods of time. The same holds even for the electric refrigerators, air conditioners, refrigerated show cases, etc.

When the compressor of the vehicle from which the coolant is to be recovered is driven according to the prior art, the condenser in the refrigerator circuit and the fan of the indoor evaporator in the vehicle from which to recover are not driven when the atmospheric temperature is low (e.g., $-10°$ C.). In other words, there is no endothermic action in the indoor evaporator, the coolant is not heated and the receiver tank is frozen. Therefore, the coolant does not flow and is not recovered despite the compressor of the vehicle from which to recover is driven or despite the coolant is sucked utilizing the negative pressure produced by the compressor of the vehicle that is going to recover.

The present inventors therefore have conducted keen study, have learned that a highly efficient method of recovering the coolant at a low cost can be realized by temporarily driving the compressor included in the air conditioner or in the refrigerator circuit in the apparatus from which the coolant is to be recovered, such as cars or refrigerators out of service, and have arrived at the present invention.

So far, furthermore, there has been employed a three-way valve for recovering a pressurized fluid, wherein a coupler is connected to discharge the pressurized fluid out of the pressurized fluid circuit such as a refrigerator circuit, the three-way valve communicating the interior of the refrigerator circuit from which to recover with the exterior of the circuit. The three-way valve is normally closed but is opened for the first time upon connecting the coupler. In this case, the coupler that is connected is equipped with an automatic stop valve even on the side of the circuit from which to recover, in order to prevent the pressurized fluid from flowing into the environment. However, the coupler has boon designed to be connected through one-touch operation and has also been designed to be disconnected through one-touch operation by simply moving the sleeve with a finger toward the direction of disconnection, leaving such a probability that the coupler in a connected state may be inadvertently and undesirably disconnected.

Accordingly, there has been proposed a highly safe coupler incorporating a double-lock mechanism which does not permit the coupler to be disconnected despite the sleeve is simply moved in the direction of disconnection, as disclosed in, for example, Japanese Unexamined Patent Publication (Kokai) No. 68292/1997.

However, there has not yet been known a three-way valve for recovering a pressurized fluid, which is disposed in the pressurized fluid circuit and which is opened to the recovery circuit through one-touch operation as the coupler molded integrally therewith is connected.

So far, therefore, a double action is required, i.e., a manually operated three-way valve is provided for the pressurized fluid circuit and is, then, opened to the recovery circuit after the coupler is connected.

It may appear that the double action is not much of a work. To carry out the "method of recovering a coolant, apparatus therefor and tool therefor" of the present invention by using a conventional three-way valve, however, the three-way valve is closed, first, and then the coupler is connected (which is usually the way it is). In this case, the compressor does not readily come into a halt, and the pressure of the fluid suddenly rises. In the worst case, the refrigerator circuit in ruptured. Therefore, the three-way valve must be operated simultaneously with the connection of the coupler, which, however, could not be accomplished with the conventional combination of the three-way valve and the coupler that were independent from each other.

SUMMARY OF THE INVENTION

The present inventors have discovered the fact that the above-mentioned problem could be solved by operating the three-way valve simultaneously with the coupler unit that is molded integrally therewith, and have thus accomplished the three-way valve of the present invention.

The object of the present invention is to provide a method of highly efficiently recovering a coolant at a low cost and an apparatus therefor.

Another object of the present invention is to provide a method of recovering a coolant by utilizing the refrigerator circuit of the apparatus from which the coolant is to be recovered, such as a car or an apparatus out of service, and an apparatus therefor.

A further object of the present invention is to provide a method of voluntarily recovering a coolant by driving only a compressor in the apparatus from which the coolant is to be recovered.

A still further object of the present invention is to enhance safety after the recovery and to lessen the contamination to the environment by burning the fuel remaining in the fuel tank as efficiently as possible when the apparatus from which to recover is an automobile.

A yet her object of the present invention is to provide a piercing/shutting-off tool which is very effective in carrying out the method of recovering a coolant according to the present invention, and which ensures a high operation efficiency and an excellent degree of safety.

Another object of the present invention is to provide a three-way valve for recovering a pressurized fluid comprising a valve unit and a coupler unit, and having a function enabling the three-way valve unit to be opened to the recovery circuit as the coupler unit is connected to the recovery circuit.

A further object of the present invention is to readily recover the pressurized fluid by the external recovery circuit without causing the pressure to suddenly rise despite the compressor is not halted at the time of recovering the pressurized fluid such as coolant.

A further object of the present invention is to quickly recover the pressurized fluid safely, reliably and in a fool-proof manner.

According to the present invention, there are provided:

A method of recovering a coolant by driving a compressor in a refrigerator circuit from which the coolant is to be recovered, wherein a passage is shut off between a condenser and a high-pressure outlet port of the compressor in the refrigerator circuit from which the coolant is to be recovered, and a recovery conduit connected to the passage near the high-pressure outlet port of the compressor between the shut-off point and the compressor is connected to a coolant recovery tank through the condenser that utilizes gravity, thereby to recover the coolant highly efficiently (claim 1);

A method of recovering a coolant according to claim 1, wherein the coolant is liquefied through the condenser that utilizes gravity, and the liquefied droplets of the coolant are downwardly moved and collected by utilizing the gravity and vibration so as to be recovered in the coolant recovery tank (claim 2);

An apparatus for recovering a coolant by using, as a pressurizing source, a compressor in a refrigerator circuit from which the coolant is to be recovered, wherein a recovery pipe is connected to a passage near a high-pressure outlet port of said compressor in said refrigerator circuit from which the coolant is to be recovered while shutting off the passage leading to a condenser, and said recovery pipe is connected to a coolant recovery tank through the condenser that utilizes gravity (claim 3);

An apparatus for recovering a coolant according to claim 3, wherein said condenser that utilizes gravity is constituted by a round and/or square spiral or zig-zag pipe having a small flow resistance and being downwardly inclined (claim 4);

An apparatus for recovering a coolant according to claim 3, wherein the condenser utilizing gravity is constituted by a pipe having fins and is quipped with a fan for forced air cooling (claim 5);

An apparatus for recovering a coolant according to claim 3, wherein the condenser utilizing gravity is of the water-cooled type using a water jacket or a cooling tower (claim 6);

An apparatus for recovering a coolant according to claim 3, wherein the condenser utilizing gravity is equipped with a vibration device for vibrating part or whole thereof (claim 7);

An apparatus for recovering a coolant according to claim 3, wherein the coolant recovery tank is of the water-cooled type (claim 8);

A pipe piercing/shutting-off tool used for a high-pressure outlet port of a compressor in a refrigerator circuit from which a coolant is to be recovered, comprising a piercing portion having a sharp blade-like open edge for piercing a hole for recovering the coolant by being pushed into the pipe in nearly the radial direction thereof, and a pressurized shut-off portion for shutting off the refrigerator circuit at a portion on the downstream side of the pierced portion simultaneously with the piercing (claim 9); and A pipe piercing/shutting-off tool according to claim 9, wherein the moving power is produced by a hydraulic pressure cylinder (claim 10).

The invention further provides:

A three-way valve for recovering a pressurized fluid comprising a valve unit and a coupler unit, wherein either a socket or a plug of the coupler unit is a lock or a key for actuating the valve of the three-way valve, and the other one is a key or a lock therefor (claim 11);

A three-way valve for recovering a pressurized fluid according to claim 11, wherein the coupler unit comprises a socket connected to the circuit for recovering the pressurized fluid and a plug on the side of the valve unit (claim 12);

A three-way valve for recovering a pressurized fluid according to claim 11, wherein the valve in the three-way valve is turned by turning either the socket or the plug of the coupler unit by a finger tip or by using an attached or a separately furnished tool key (claim 13);

A three-way valve for recovering a pressurized fluid according to claim 11, wherein the valve in the three-way valve is turned via a spiral mechanism by utilizing a pushing force at the time of connecting the socket and the plug of the coupler unit (claim 14);

A three-way valve for recovering a pressurized fluid according to claim 11, wherein the inlet port of the valve unit is provided with a pressure switch and/or a by-pass having a pressure valve is provided across the inlet port and the outlet port of said valve unit, as a safety device in case the recovery passage is not opened due to some cause despite the initial passage is shut off (claim 15);

A three-way valve for recovering a pressurized fluid according to claim 11 or 15, wherein the pressurized fluid is any one of various kinds of freon gases, a coolant inclusive of ammonia gas, an operation fluid, the compressed air, LPG, LNG, liquefied nitrogen or liquefied oxygen, or is a mixture thereof (claim 16).

BRIEF DESCRIPTION OF THE DRAWINGS

FIG. 28 is a sectional view illustrating a portion of an embodiment 9 (safety by-pass).

Figure 1:
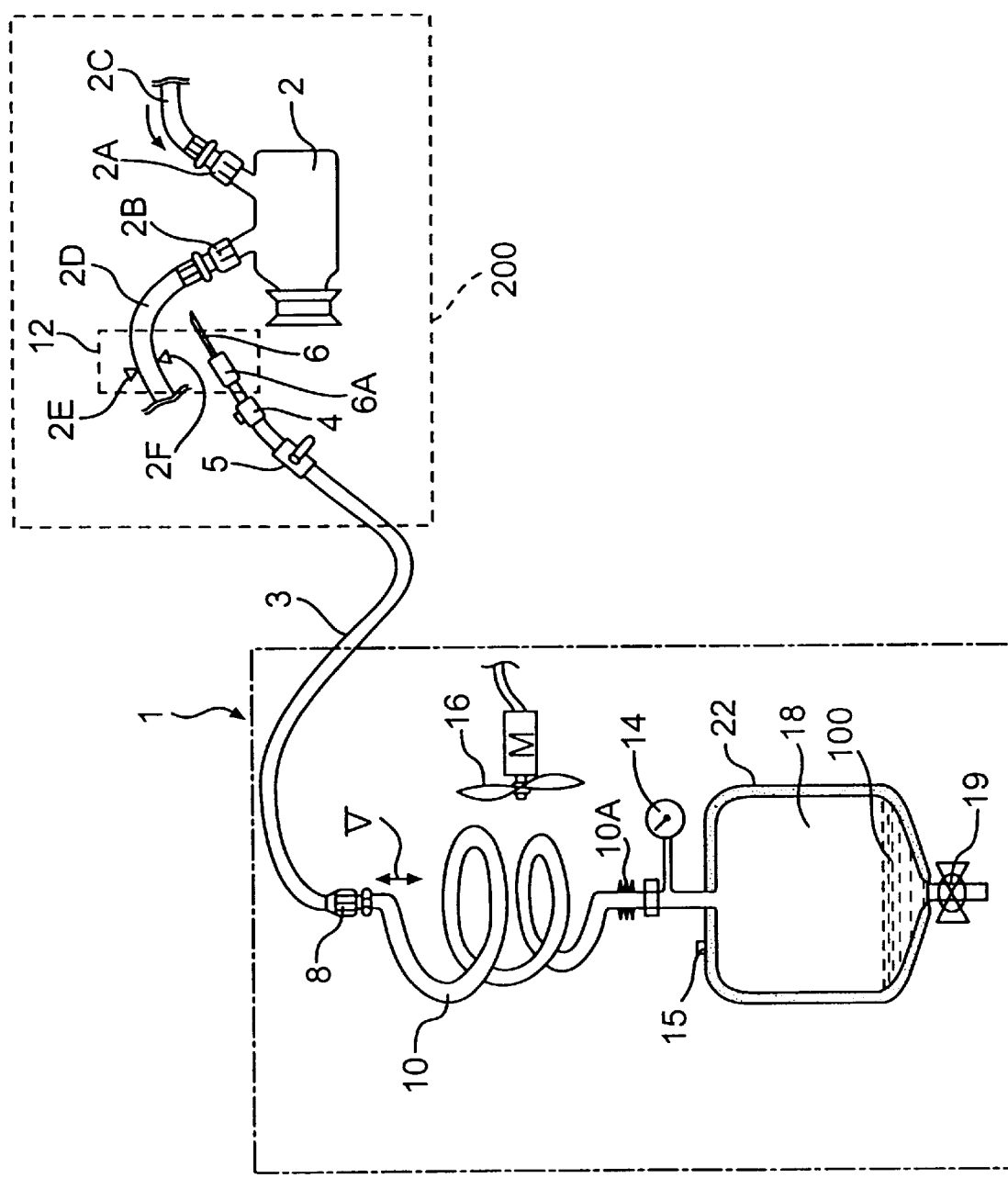
FIG. 1 is a view schematically illustrating an embodiment of the present invention.

In the Drawings:
1—coolant recovery apparatus
2—compressor in a vehicle from which the coolant is to be recovered
2A—low-pressure inlet port of compressor
2B—high-pressure outlet port of compressor
2C—low-pressure hose
2D—high-pressure hose
2E—pressurized shielding portion
2F—pressurized shielding portion
2G—receiver tank
2H—evaporator
2I—blower
2J—condenser
2K—engine room
3—coolant recovery hose
4—joint with air vent
5—valve
6—piercing pipe
6A—nut joint
8, 9—joints
10—condenser utilizing gravity
10A—flexible tube
11—support arm
11A—coil spring
11B—support bracket
12—piercing/shutting-off tool
M—motor
14—pressure gauge
15—safety valve
16—electrically-driven fan
18—coolant recover tank
19—coolant take-out valve
20—vibration source
22—heat-insulating member
25—water jacket
25A—cooling water inlet port
25B—cooling water outlet port
100—liquid coolant that is recovered
200—refrigerator circuit in a vehicle from which the coolant is to be recovered
1100—embodiment 6
1200—embodiment 7
1300—embodiment 8
1400—embodiment 9
1101, 1201, 1301—valves units (valve boxes)
1102A, 1102B—normal fluid passages
1202A, 1202B—normal fluid passages
1302A, 1302B—normal fluid passages
1402A, 1402B—normal fluid passages
1103, 1203—valves
1303, 1403—valves
1103A, 1203A—normal passages of valves
1303A, 1403A—normal passages of valves
1103B, 1203B—upper parts of valves
1303B, 1403B—upper parts of valves
1104, 1204—valve-turning socket holes
1304—rotary socket hole of valve
1104B, 1204B—fluid escape grooves
1304B—fluid escape groove
1105, 1205—fluid recovery passages
1305—fluid recovery passage
1105A, 1205A—inlet ports of fluid recovery circuit
1305A—inlet port of fluid recovery circuit
1105A, 1105C—fluid recovery passages
1205B, 1205C—fluid recovery passages
1305B, 1305C—fluid recovery passages
1106, 1206—plugs of a coupler unit
1306—plug of a coupler unit
1207, 1307—annular engaging protuberances of the plugs
1208, 1308—positioning notches
1109, 1209—sockets of coupler units
1309—socket of coupler unit 1109A, 1209A—socket outers of coupler units
1309A—socket outer of coupler unit
1109B, 1209B—socket inners of coupler units
1309B—socket inner of coupler unit
1110, 1210, 1310—O-rings
1111, 1211—coupling shafts
1311—depressing shaft
1111A, 1211A—lower ends of coupling shafts
1311A—lower end of depressing shaft
1112, 1212—coil springs for valves
1312, 1412—coil springs for valves
1212A, 1312A—coil springs for sleeves
1212B—coil spring for opening/closing locking balls
1213—coupling pin
1213A—coupling pin bole
1213B, 1213C—elongated coupling pin holes
1114, 1214, 1314—threaded closures at the lower ends of valve units
1215, 1315—stop rings
1216, 1316—locking balls
1216A, 1316A—locking ball holes
1117, 1217, 1317—threaded portions
1218, 1318—positioning protuberances
1119, 1219, 1319—check valves
1220—rod-like positioning protuberance
1221—positioning recessed portion
1222, 1322—sleeves
1223—grip of sleeve
1224—opening/closing lock groove
1225—flow rate scale
1226—flow rate scale reading mark
1227—locking balls for locking/unlocking
1228—coupling pin hole of sleeve
1229—hole for locking balls in the grip of sleeve
1330—protuberance that slides along a spiral groove at the upper part of the valve (secured to the lower part 1311A of the coupling shaft)
1331—spiral groove
1215A, 1315A—stop ring grooves
1140—engaging protuberance for positioning
1140A—L-shaped engaging groove for positioning
1441—pressure switch
1442—safety valve
1443—by-pass

DETAILED DESCRIPTION OF THE INVENTION

The invention will now be described in detail by way of embodiments described in claims 1 to 10.

Method of Recovering a Coolant and Apparatus

Figure 2:
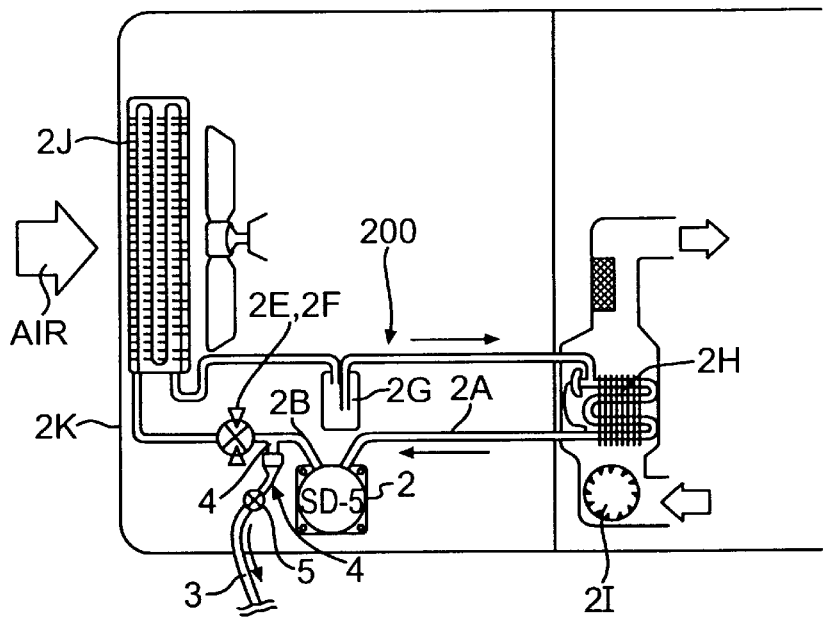
FIG. 2 is a view schematically illustrating a refrigerator circuit of the present invention.
Figure 3:
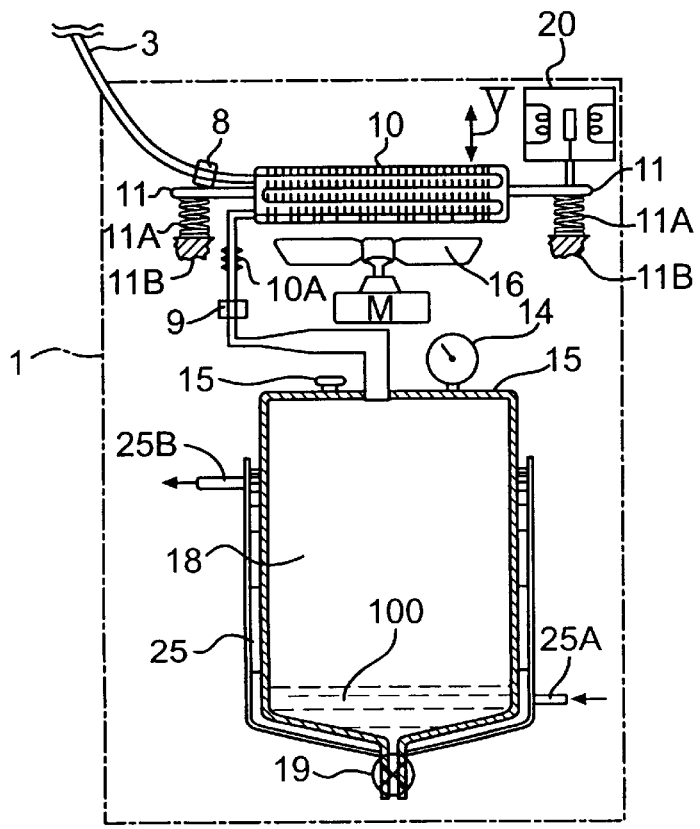
FIG. 3 is a sectional view schematically illustrating a condenser utilizing gravity according to the present invention.

FIG. 1 is a view schematically illustrating an embodiment of the present invention, FIG. 2 is a view schematically illustrating a refrigerator circuit of the present invention, and FIG. 3 is a sectional view schematically illustrating a condenser utilizing gravity according to the present invention.

In FIGS. 1 to 3, reference numeral 1 denotes a coolant recovery apparatus, 2 denotes a compressor in a vehicle from which the coolant is to be recovered, 2A denotes a low-pressure inlet port of the compressor, 2B denotes a high-pressure outlet port of the compressor, 2C denotes a low-pressure hose, 2D denotes a high-pressure hose, 2E and 2F denote pressurized shielding portions, 2G denotes a receiver tank, 2H denotes an evaporator, 2I denotes a blower, 2J denotes a condenser, 2K denotes an engine room, 3 denotes a coolant recovery hose, 4 denotes a joint with air vent, 5 denotes a valve, 6 denotes a piercing pipe, 6A denotes a nut joint, 8 and 9 denote joints, 10 denotes a condenser utilizing gravity, 10A denotes a flexible tube, 11 denotes a support arm, 11A denotes a coil spring, 11B denotes a support bracket, 12 denotes a piercing/shutting-off tool, M denotes a motor, 14 denotes a pressure gauge, 15 denotes a safety valve, 16 denotes an electrically-driven fan, 18 denotes a coolant recovery tank, 19 denotes a coolant take-out valve, 20 denotes a vibration source, 22 denotes a heat-insulating member, 25 denotes a water jacket, 25A denotes a cooling water inlet port, 25B denotes cooling water outlet port, 100 denotes a liquid coolant that is recovered, and reference numeral 200 denotes a refrigerating circuit in a vehicle from which the coolant is to be recovered.

Referring again to FIGS. 1 to 3, a compressor of a vehicle from which the coolant is to be recovered (or electric refrigerator, refrigerated show case, air conditioner in a large building) is driven. Usually, a small amount of fuel is remaining in the fuel tank of the vehicle from which to recover, or at least a small amount of fuel is remaining in the fuel pipe. Therefore, if an electric power is supplied from a DC 12V to 24V battery, the engine of the vehicle in most cases runs for 5 to 10 minutes or longer. Thus, the compressor 2 can be driven maintaining a considerably high reliability. In the case of an electric refrigerator, refrigerated show case or air conditioner in a large building in which an electric motor is used as a drive source, an electric power of a 100V AC single-phase or a 200V AC three-phase may be supplied to drive the compressor.

Among the cars out of service as a result of buying new cars, more than 95% of them contain a coolant gas in the air conditioner circuit and the air conditioner circuit can be operated provided the engine is started by a battery. Among those cars accounting for 95%, 1 to 2% are those cars of which the engines can be started but the air conditioners cannot be operated due to troubles in the electric circuits. Therefore, the coolant can be recovered from most of the vehicles without relying upon the external drive source. In the case of the refrigerators and freezers out of service, more than 99% of the refrigerator circuits can be operated promising a self-recovery which is close to 100%.

Therefore, the coolant recovery hose 3 connected to the high-pressure outlet port 2B of the compressor on the side of the closed circuit, is connected to the condenser 10 that utilizes gravity by the piercing/shutting-off tool 12 in the refrigerator circuit of the vehicle from which the coolant is to be recovered. Then, the condenser 10 utilizing gravity is vibrated up and down as designated at V by the vibration source 20 such as an electromagnetic vibrator or a reciprocal vibration device based on a rotary machine.

At the same time, the condenser 10 utilizing gravity is air-cooled by an electric tan 16 driven by a motor (or which may be a fan driven by the crankshaft of an engine through a V-belt).

The condenser 10 utilizing gravity is a heat exchanger of a round or square spiral or zig-zag hose having a gravity gradient, and has a round, a square, an oval or an elliptic shape in cross section to create a small flow resistance and to exhibit a large heat-radiating effect. The pipe may be provided with fins to enhance the heat-radiating effect. Besides, the pipe may be held by plate-like fins to enhance the rigidity as a whole, so that vibration V is given to the condenser as a whole.

Therefore, the condensed droplets of freon gas in the condenser are efficiently trapped and stays in the coolant recovery tank 18 located at a lower portion due to gravity. The periphery of the coolant recovery tank 18 may be covered with the heat-insulating material 22 or may be cooled by the water jacket 25, so that the coolant can be contained in large amounts even in summer where the atmospheric temperature is high. As the recovered liquid coolant 100 is contained in a predetermined amount, the lower coolant take-out valve 19 is opened to transfer the coolant to another portable container. The coolant recovery tank 18 itself may be designed so as to be transported, as a matter of course. The condenser 10 utilizing gravity may be water-cooled by using the water jacket or the cooling tower which is based on the heat of vaporization of water. Or, the condenser may be of the type which is directly sprayed.

Piercing/Shutting-Off Tool

Figure 4:
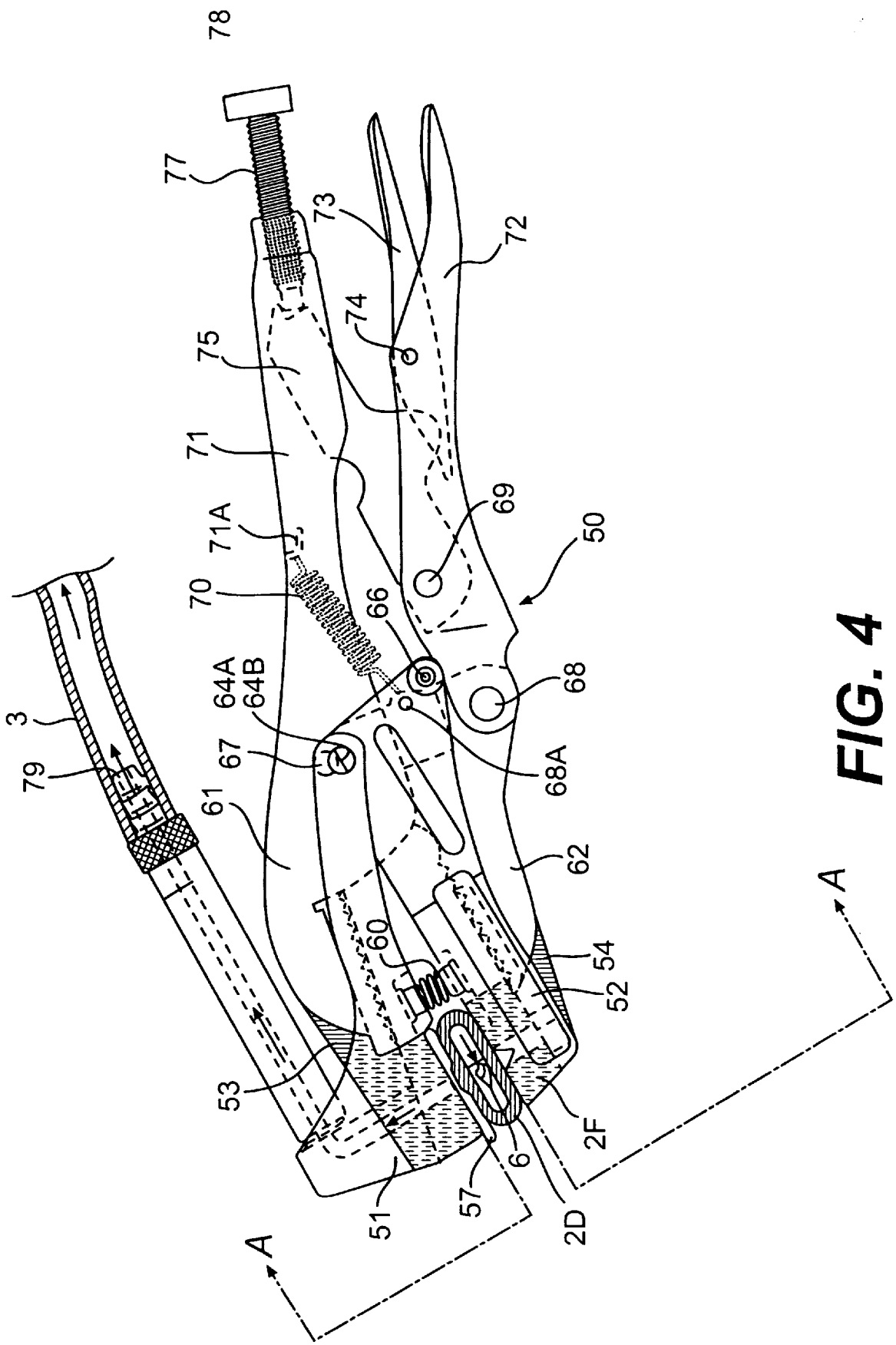
FIG. 4 is a side view of a pipe piercing/shielding tool according to an embodiment of the present invention.
Figure 5:
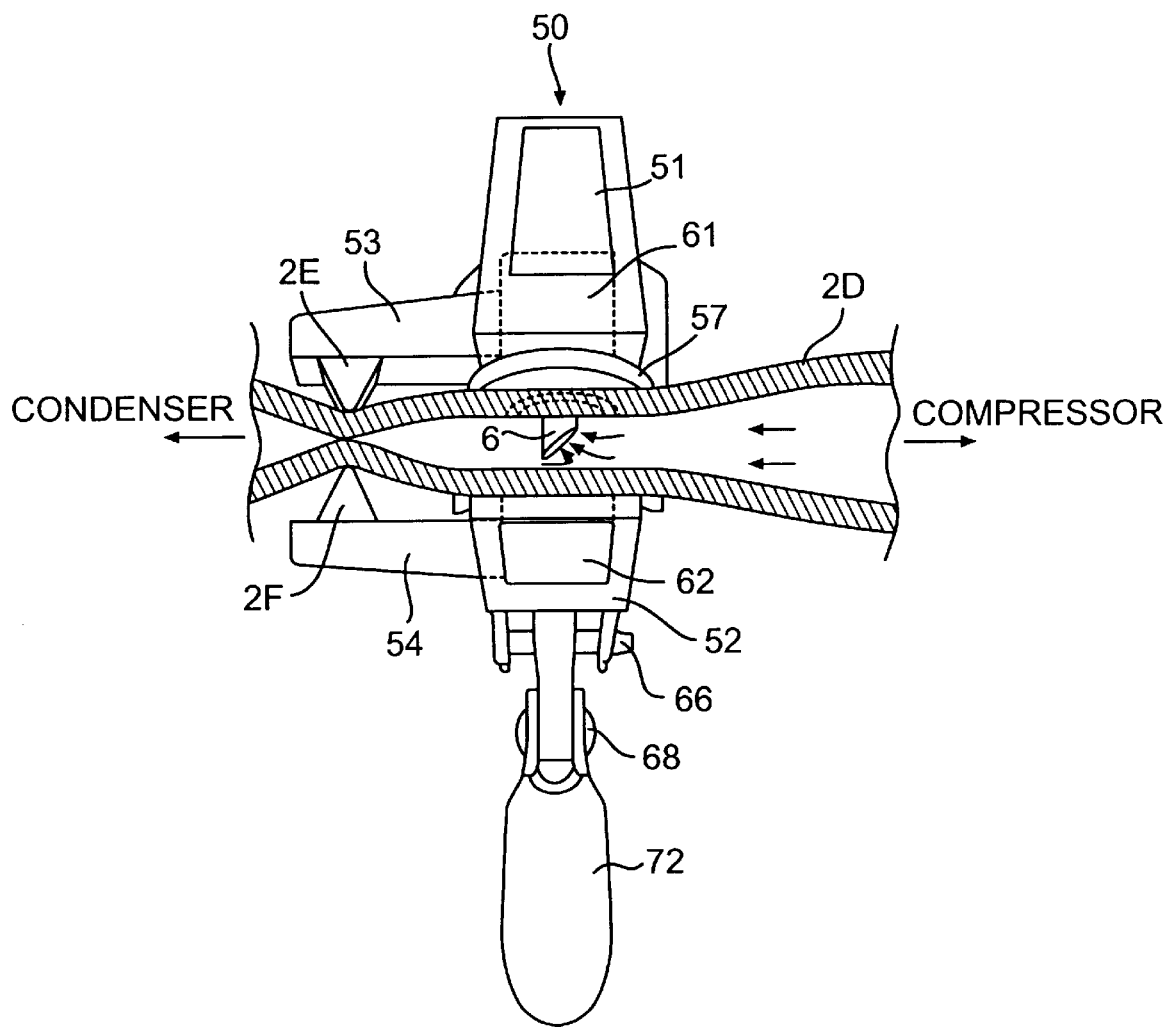
FIG. 5 is a sectional view (illustrating a portion of the front surface) along the arrow A—A in FIG. 4.

FIG. 4 is a side view of a pipe piercing/shielding tool according to an embodiment of the present invention, and FIG. 5 is a sectional view (illustrating a portion of the front surface) along the arrow A—A in FIG. 4.

In FIGS. 4 and 5, reference numeral 50 denotes a piercing/shutting-off tool, 51 denotes a plastic upper flange, 52 denotes a plastic lower flange, 53 and 54 denote arm portions, 6 denotes a piercing pipe, 57 denotes a disk with packing, 60 and 70 denote coil springs, 61 denotes a metallic upper flange, 62 denotes a metallic lower flange, 64A and 64B denote a first fulcrum for the upper and lower plastic flanges, 66 denotes a second fulcrum for the upper and lower plastic flanges, 67 denotes a first fulcrum for the upper and lower metallic flanges, 68 denotes a second fulcrum for the upper and lower metallic flanges, 69 denotes a lever fulcrum, 71 denotes an upper lever, 72 denotes a lower lever, 73 denotes an unlocking lever, 75 denotes a stroke-adjusting lever, 77 denotes a stroke-adjusting screw, 78 denotes a screw knob, and reference numeral 79 denotes a check valve.

FIG. 4 illustrates a tool of the present invention modified from a known piercing pincers. The basic mechanism will now be briefly described. A pair of upper lever 71 and lower lever 72 made of a steel move via the lower flange 62. When they are gripped by hand, the upper and lower steel flanges 61 and 62 approach together to pressurize the high-pressure hose 20 (which may be a copper pipe) held therebetween, whereby the piercing tube having a sharp end pierces therethrough so that the coolant can be discharged. The upper plastic flange is provided with a disk 57 having an annular packaging around the central piercing pipe, preventing the coolant from escaping to the external side. The lower plastic flange is provided with a round groove (not shown) for clearing the end of the piercing pipe. Furthermore, a check valve 79 is provided at the outlet port of the discharge pipe.

The stroke between the upper and lower flanges is adjusted by the screw knob 78.

Here, the important members are the pressure shut-off portions 2E, 2F and the arms 53, 54 supporting them, that are shown in FIG. 5 which is a front sectional view along the arrow A—A in FIG. 4. The arms 53, 54 are nearly symmetrically secured to the sides (left side in FIG. 5) of the upper and lower metallic flanges 61, 62. Upon strongly gripping the upper and lower levers 71, 72, the piercing pipe 6 pierces into the high-pressure hose 2D which, at the same time, is tightened by the shut-off portions 2E, 2F to shut-off the flow of the coolant.

Thus, the tool of the present invention shuts off and pierces the high-pressure hose (or copper pipe or the like pipe) simultaneously, making it possible to very highly efficiently carry out the work. It needs not be pointed out that the shut-off portions may be provided on either the right side or the left side of the upper and lower flanges. Since a strong gripping force is required, a hydraulic cylinder such as of hydraulic pressure or pneumatic pressure may be used or an electrically operated cylinder may be used to drive the tool of the present invention when the pressure cannot be applied by hand in a narrow engine room.

Examples and Mode of Operation of the Invention

Figure 6:
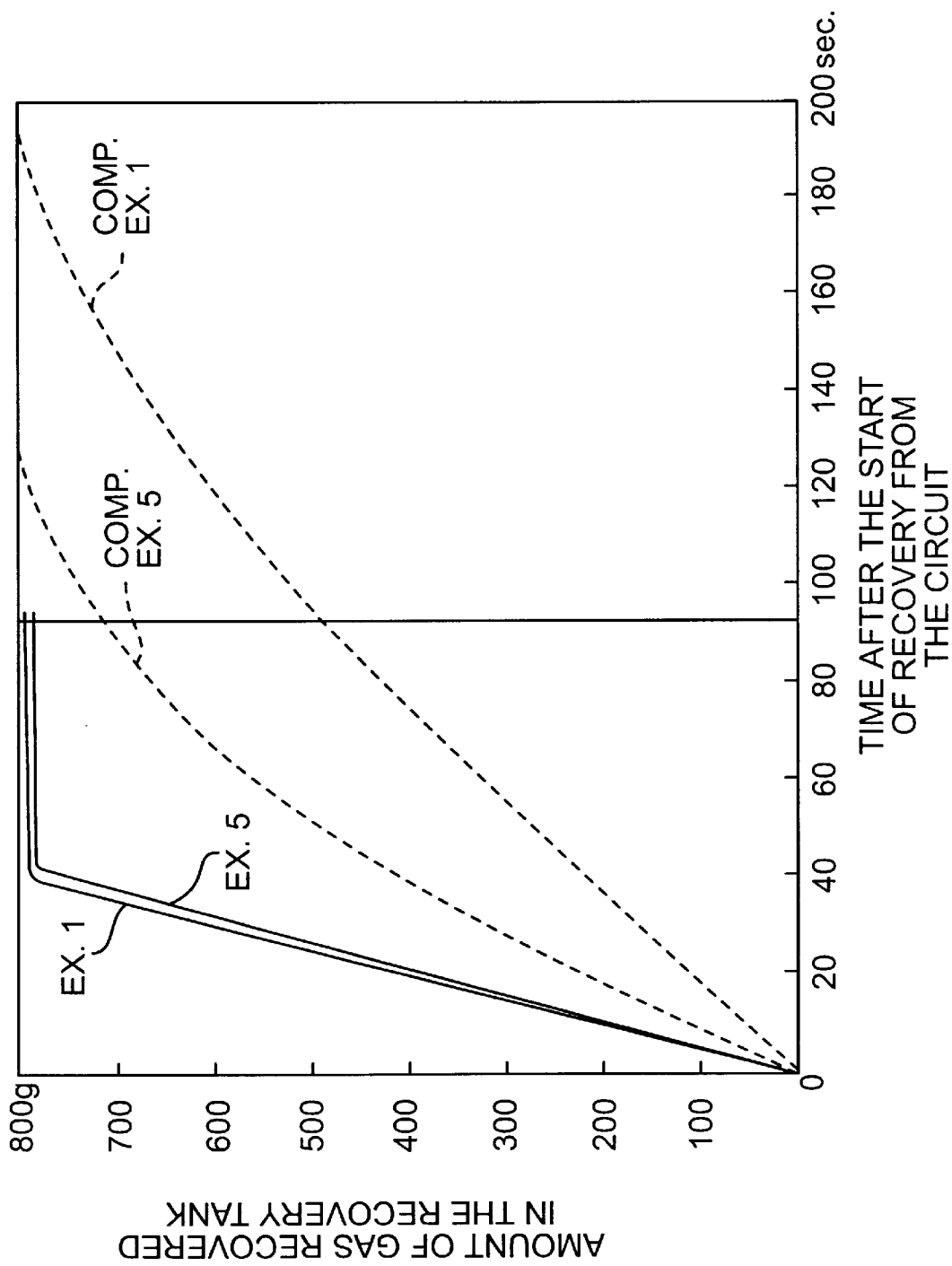
FIG. 6 is a graph illustrating a relationship between the amount of recovering the coolant and the recovery time.

Table 1 shows Examples and Comparative Examples of when the work is conducted at atmospheric temperatures of from −10° C. to 30° C. The results of Table 1 will now be described. FIG. 6 is a graph illustrating some of the results.

TABLE 1

|  | Ex. 1 | Ex. 2 | Ex. 3 | Ex. 4 | Ex. 5 |
| --- | --- | --- | --- | --- | --- |
| Ext. temp | −10° C. | 0° C. | 10° C. | 20° C. | 30° C. |
| Amount of gas in the circuit (g) | 800 g | 800 g | 800 g | 800 g | 800 g |
| Compressor drive time after high-pressure outlet side is pierced and shut off | 1 min 30 sec | 1 min 30 sec | 1 min 30 sec | 1 min 30 sec | 1 min 30 sec |
| Amount of gas recovered in the recovery tank | 790 g | 788 g | 786 g | 783 g | 780 g |
| Recovery ratio relative to gas in the circuit | 98.7% | 98.5% | 98.2% | 97.8% | 97.5% |

|  | Comp. Ex. 1 | Comp. Ex. 2 | Comp. Ex. 3 | Comp. Ex. 4 | Comp. Ex. 5 |
| --- | --- | --- | --- | --- | --- |
| Ext. temp. | −10° C. | 0° C. | 10° C. | 20° C. | 30° C. |
| Amount of gas in the circuit (g) | 800 g | 800 g | 800 g | 800 g | 800 g |
| Time after the start of recovery from the circuit of vehicle from which to recover | 1 min 30 sec | 1 min 30 sec | 1 min 30 sec | 1 min 30 sec | 1 min 30 sec |
| Amount of gas recovered in the recovery tank | 460 g | 525 g | 585 g | 650 g | 710 g |
| Recovery ratio relative to gas in the circuit | 57.5% | 65.6% | 73.1% | 81.2% | 88.7% |

According to the means of Comparative Examples, despite the compressor of the vehicle from which to recover is rotated, the condenser and the fan of the indoor evaporator are not driven in the vehicle from which to recover when the atmospheric temperature is low (about −10° C.). Therefore, the indoor evaporator does not produce the endothermic action, whereby the receiver tank is frozen. Despite the compressor is driven in the vehicle from which to recover or in the vehicle that is going to recover, in order to produce a negative pressure, the coolant does not flow and is not recovered.

That is, according to the method of the present invention by which the compressor is driven, the coolant is not vaporized and is recovered even at −10° C. According to the prior art (Comparative Example), however, the coolant is once vaporized and is liquefied again. That is, the coolant is vaporized in the circuit of the vehicle from which to recover, and the circuit is frozen. Even after the passage of time of one minute and 30 seconds or so, therefore, the interior of the recovery pipe is clogged, and the gas does not flow into the vehicle that is going to recover no matter how negative pressure is applied.

At the time of recovery, in general, the coolant that is once vaporized must be liquefied by being pressurized by the compressor in the vehicle that is going to recover. As described above, however, the circuit is frozen and clogged due to the receiver tank that is frozen in the vehicle from which to recover. Therefore, a negative pressure is simply produced in a circuit from the frozen receiver tank to the compressor through the indoor evaporator and, hence, the coolant flows with difficulty. When the temperature is low, therefore, an extended period of time is required for the recovery, and the recovery ratio drops as shown in FIG. 6. According to the embodiment of the present invention, however, this does not occur and the coolant is recovered very highly efficiently. The difference over the prior art appears conspicuously particularly at low temperatures.

The invention described in claims 11 to 16 will now be described in detail by way of embodiments 6 to 9.

Figure 7:
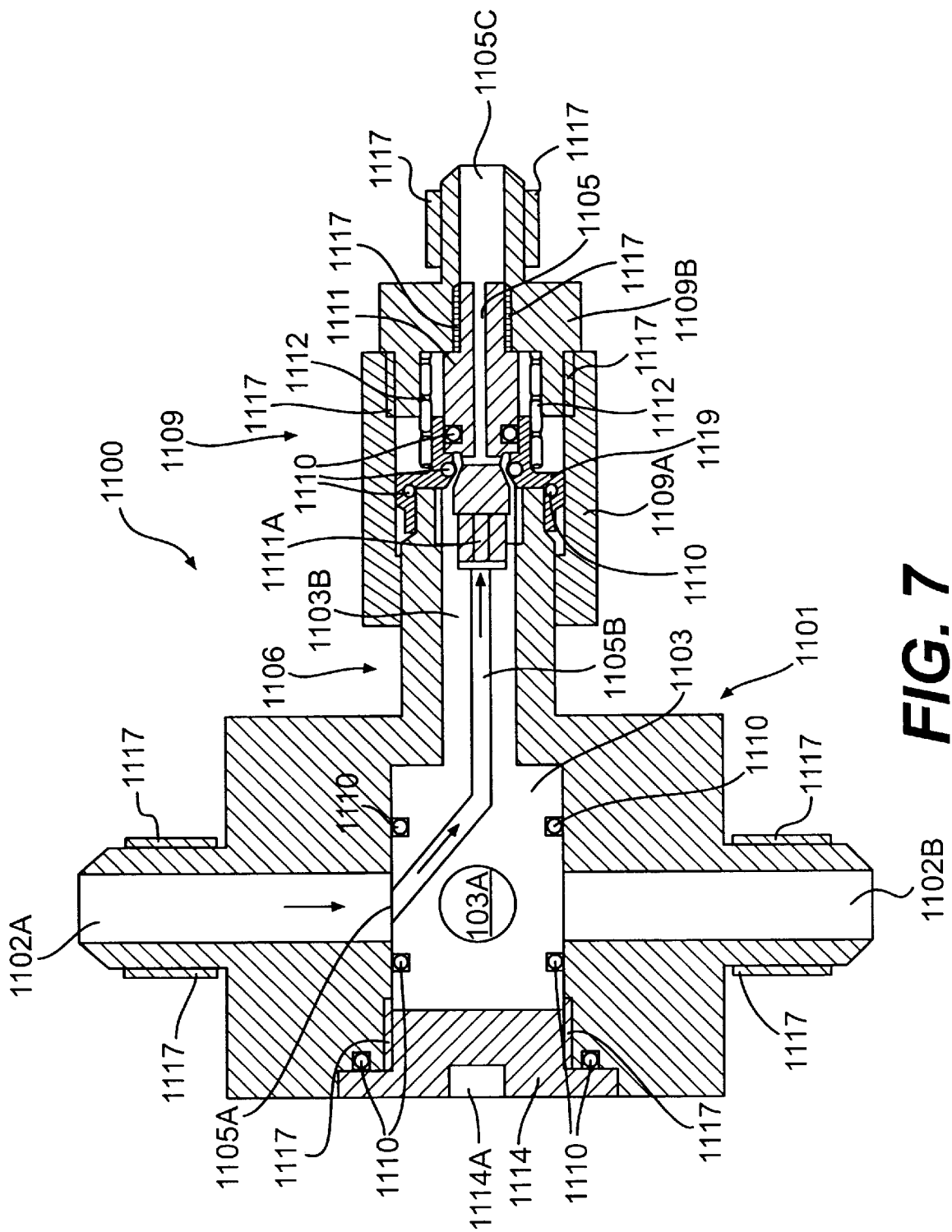
FIG. 7 is a sectional view of an embodiment 6 (ON-OFF type) of when the fluid is to be recovered.
Figure 8:
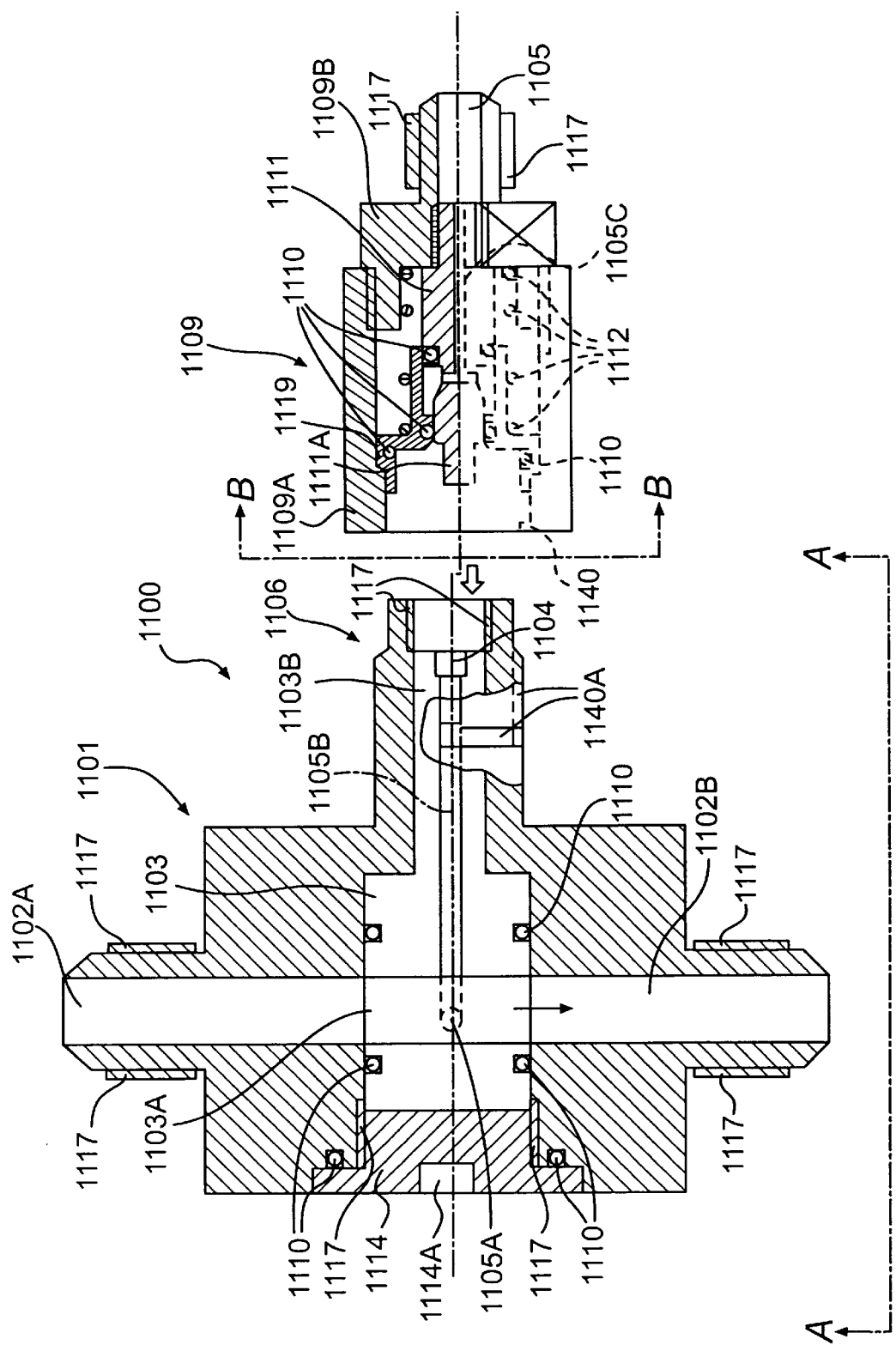
FIG. 8 is a sectional view of the embodiment 6 during the normal state.
Figure 9:
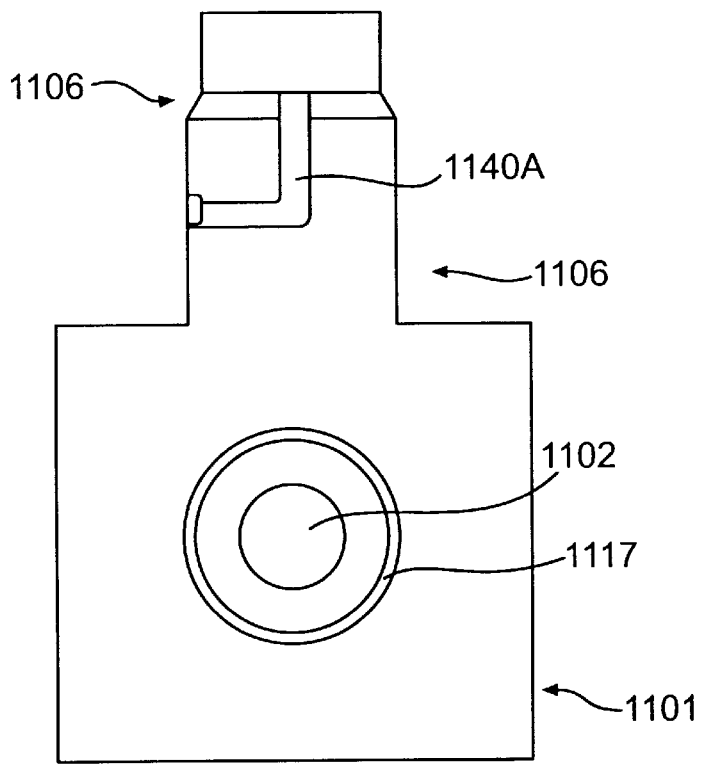
FIG. 9 is a view along the arrow A—A in FIG. 8.
Figure 10:
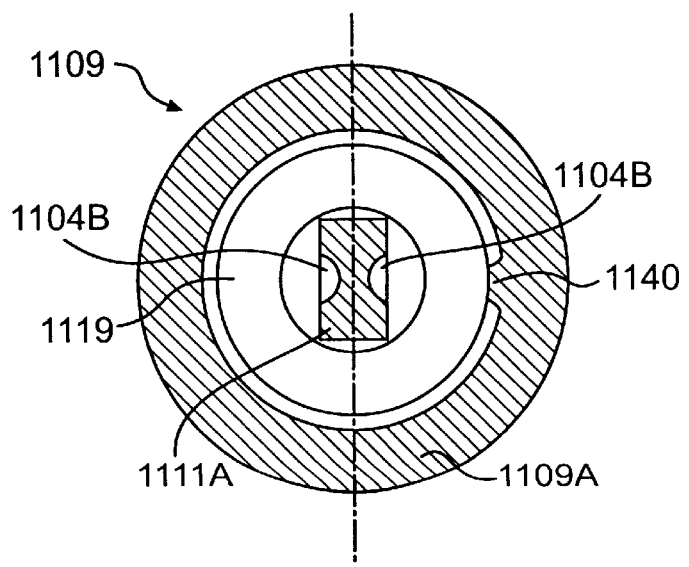
FIG. 10 is a view along the line B—B in FIG. 8.
Figure 11:
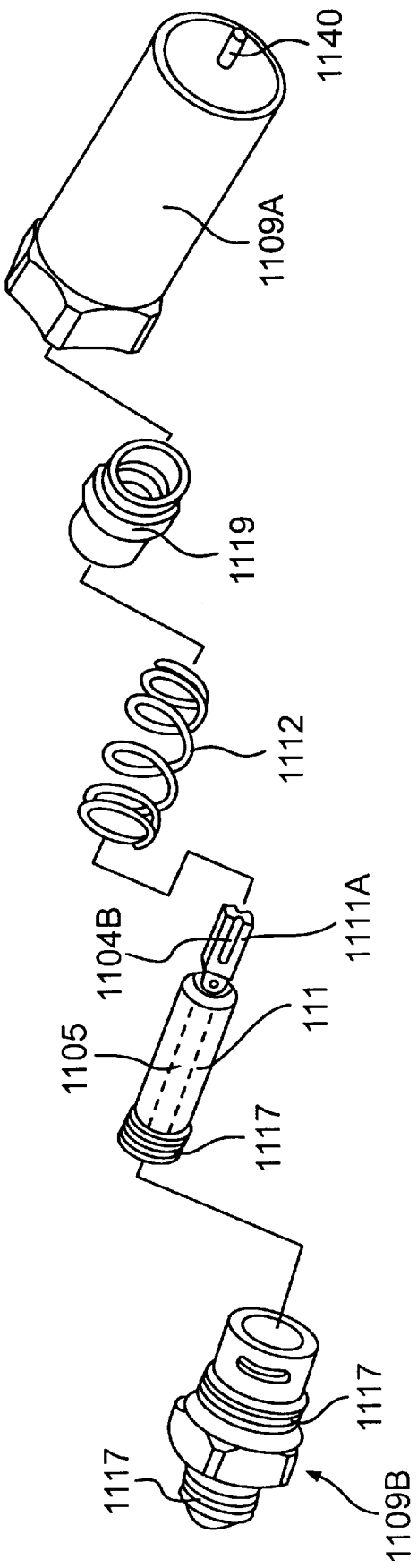
FIG. 11 is a view of a socket in a disassembled state.
Figure 12:
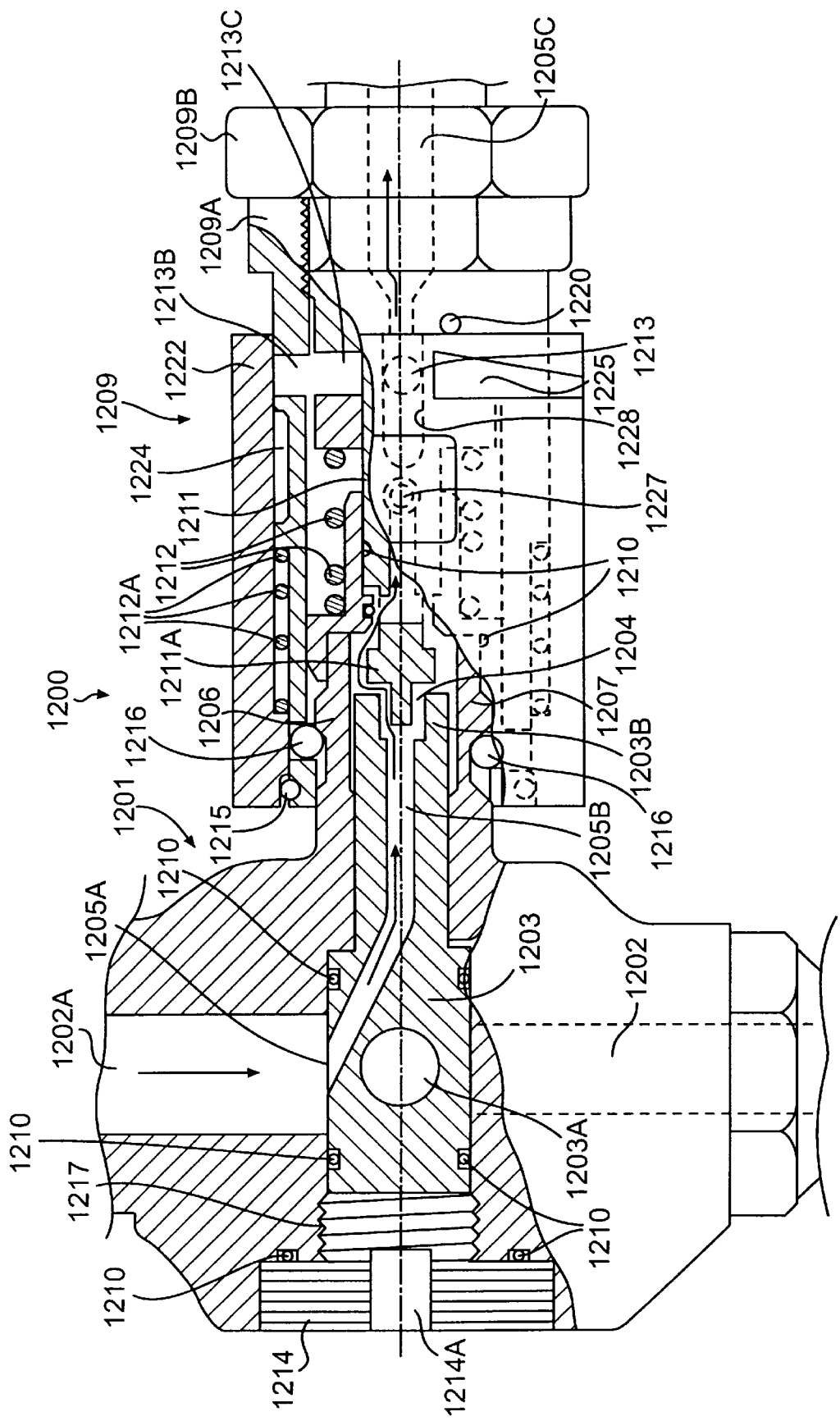
FIG. 12 is a sectional view illustrating a portion of an embodiment 7 (proportional control type) of when the fluid is to be recovered.
Figure 13:
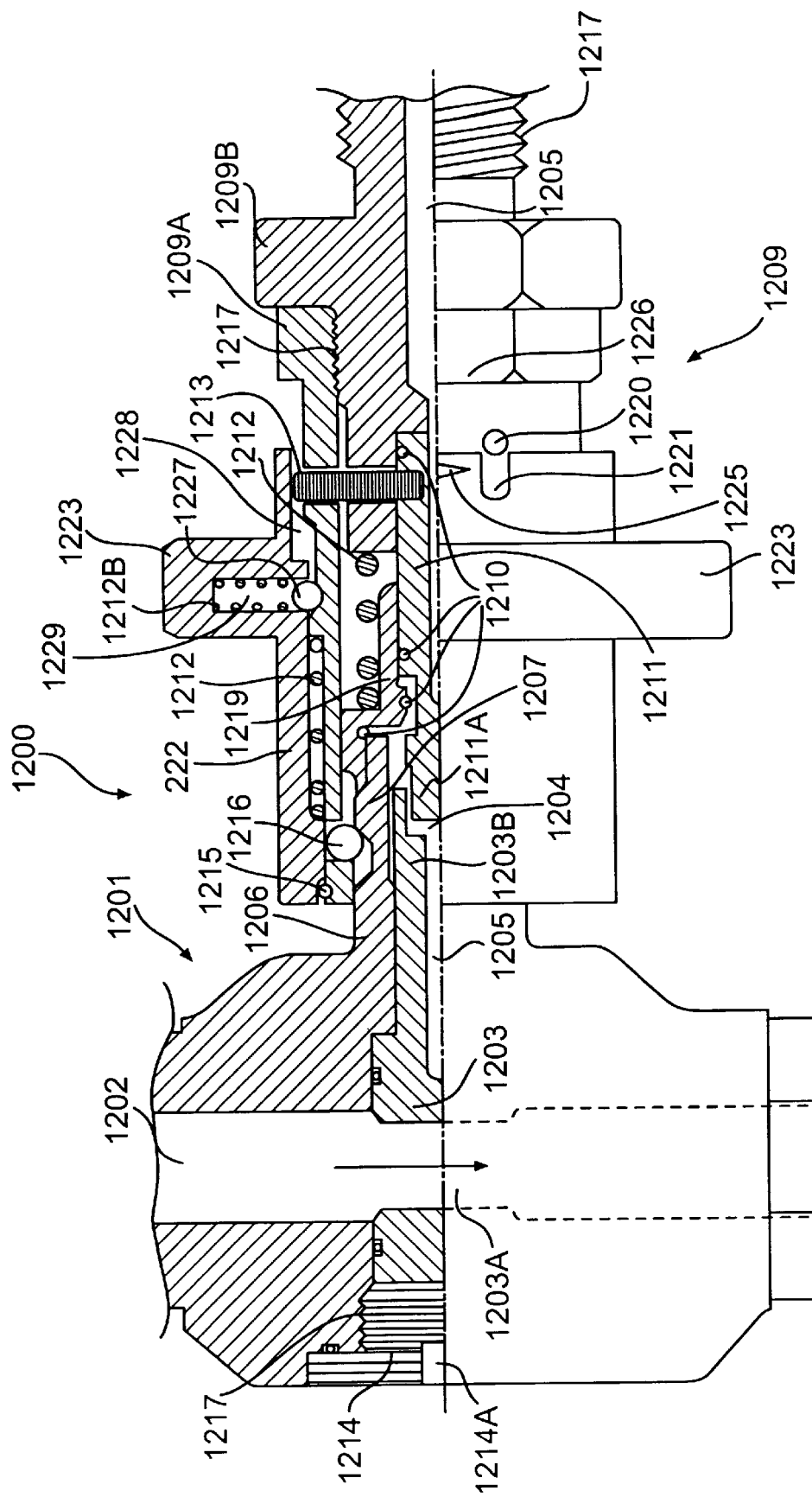
FIG. 13 is a sectional view illustrating a portion of the embodiment 7 (proportional control type)
Figure 14:
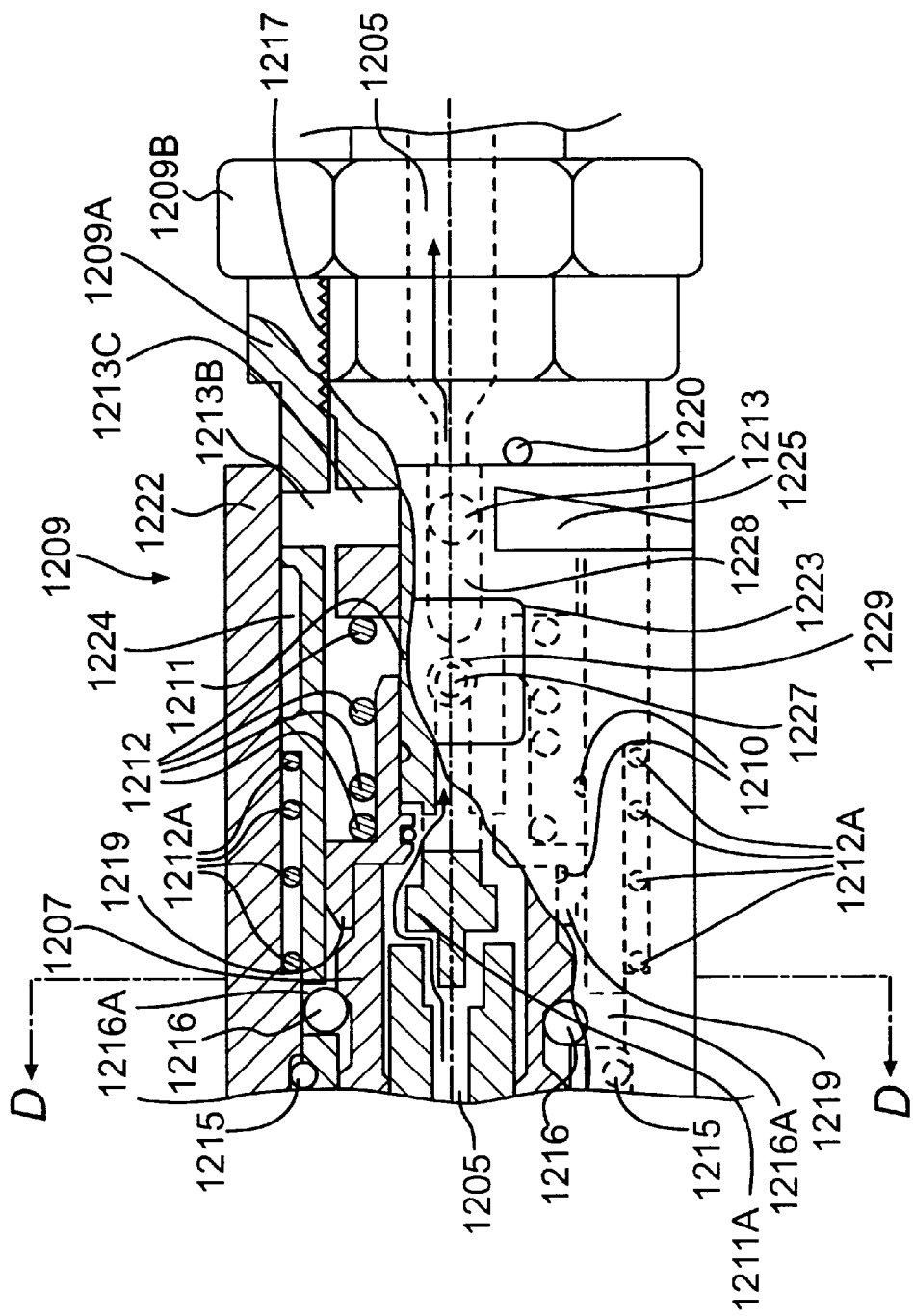
FIG. 14 is a sectional view illustrating a portion of the socket which is part of the embodiment 7 of when the fluid is to be recovered.
Figure 15:
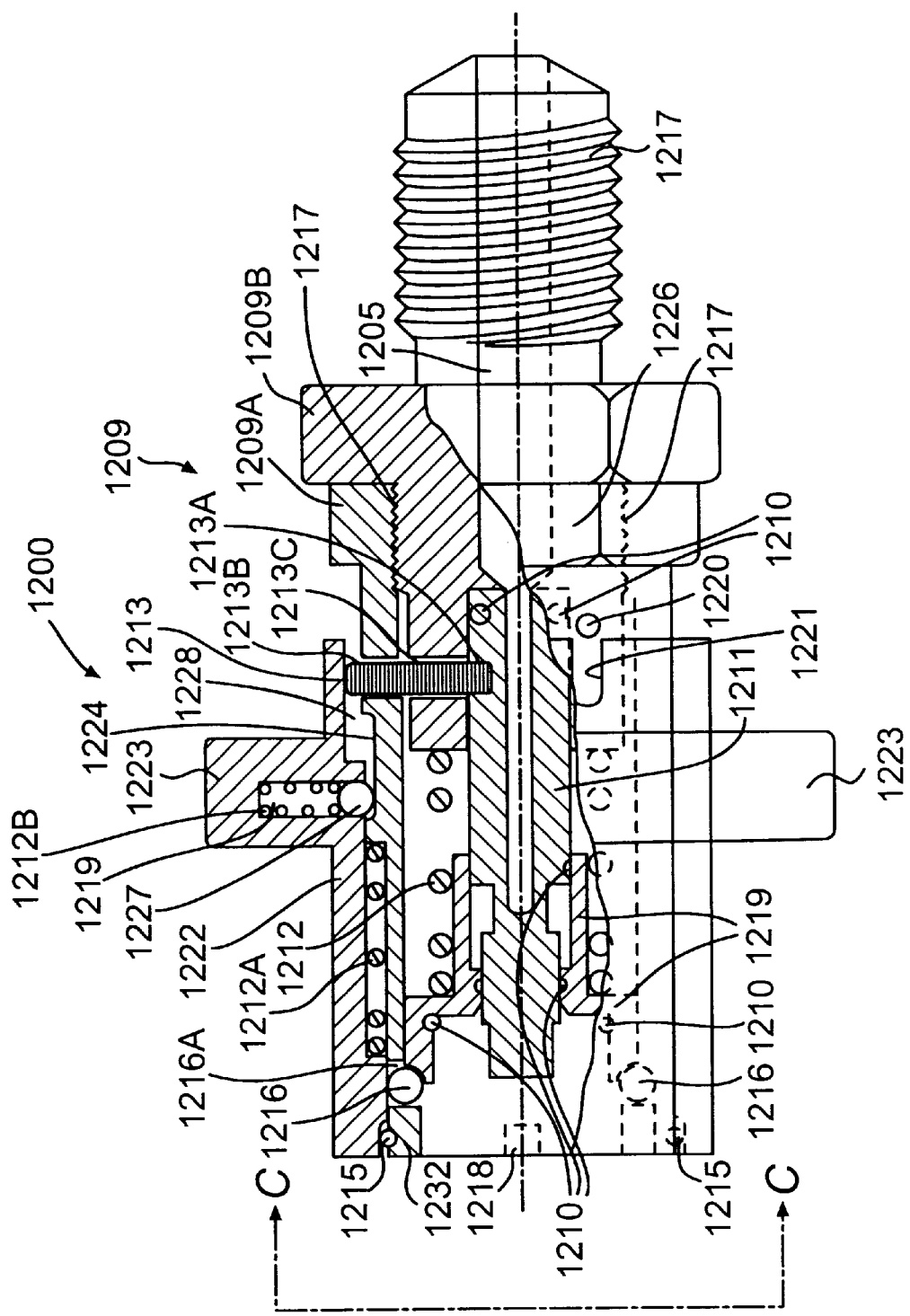
FIG. 15 is a sectional view illustrating a portion of the socket of when it is normally placed (before being inserted) according to the embodiment 7.
Figure 16:
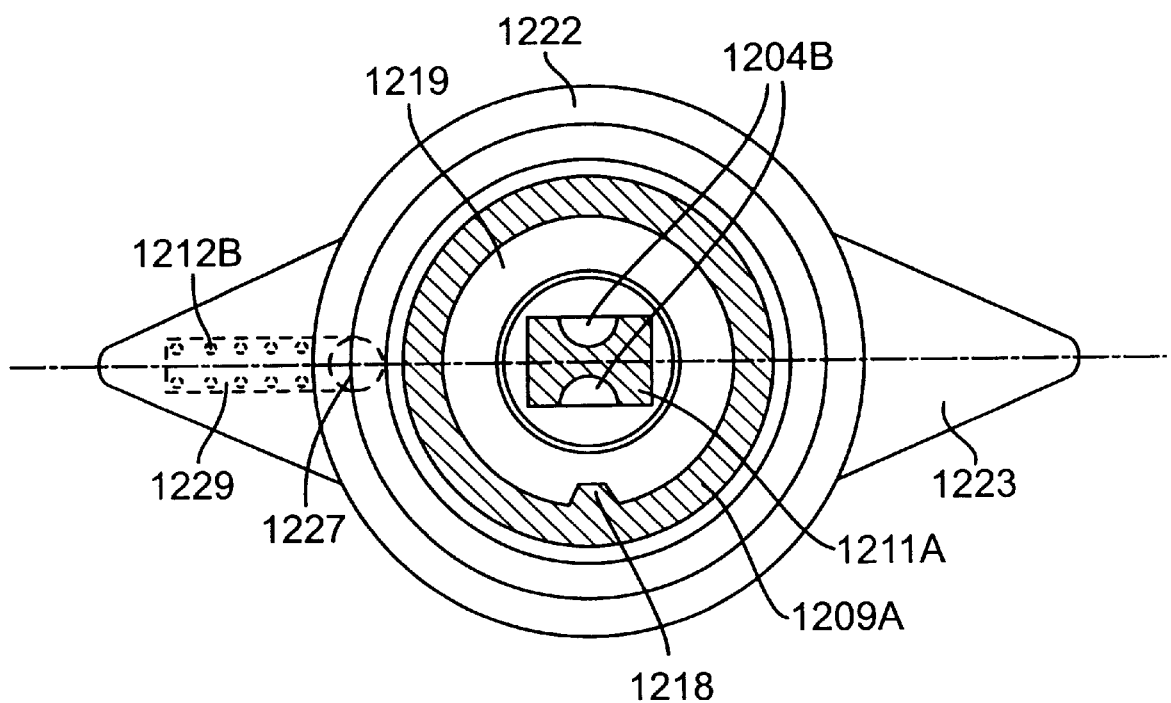
FIG. 16 is a view along the line C—C in FIG. 15.
Figure 17:
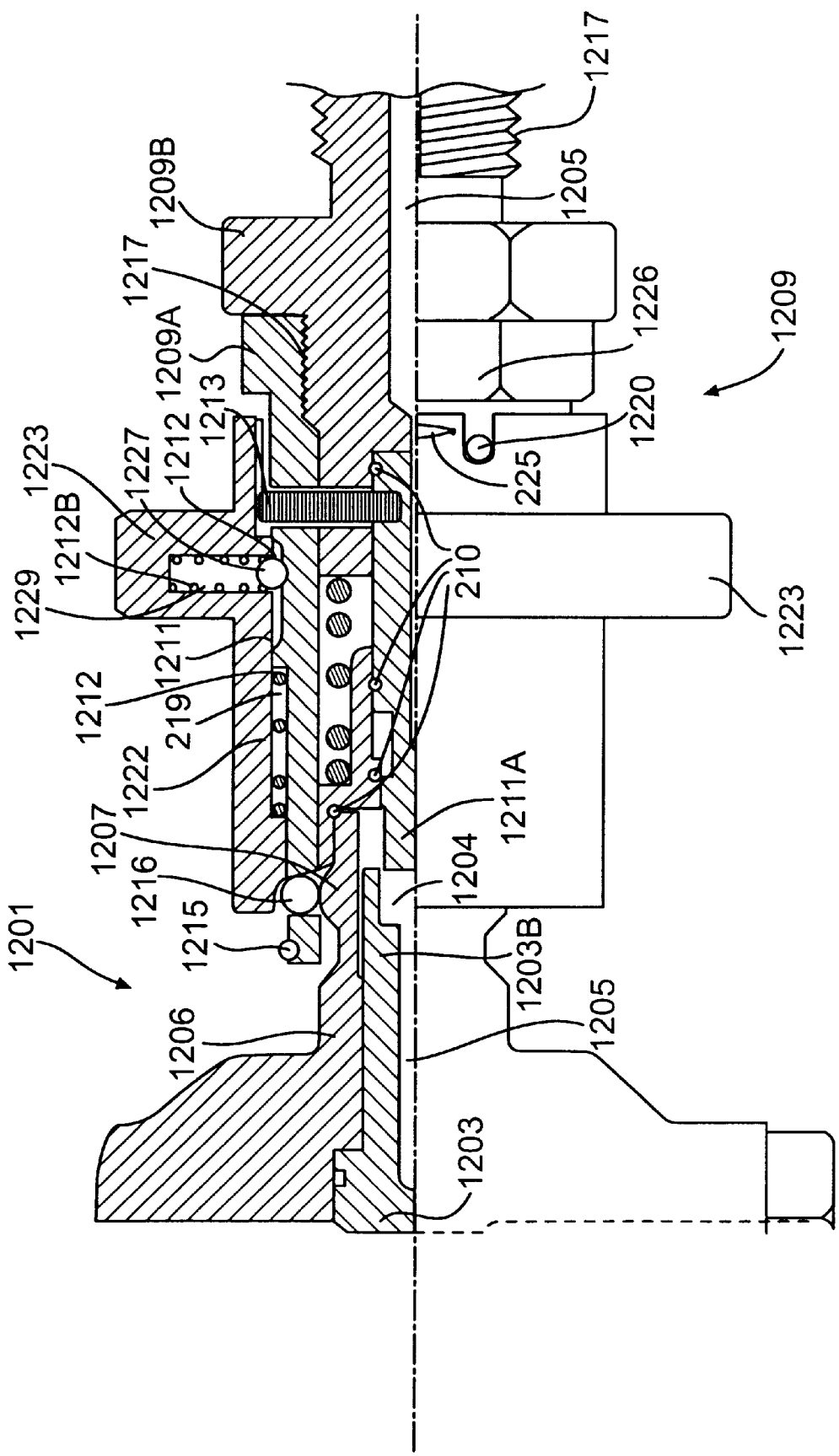
FIG. 17 is a sectional view illustrating a portion of the socket of the embodiment 7 of when it is being fitted.
Figure 18:
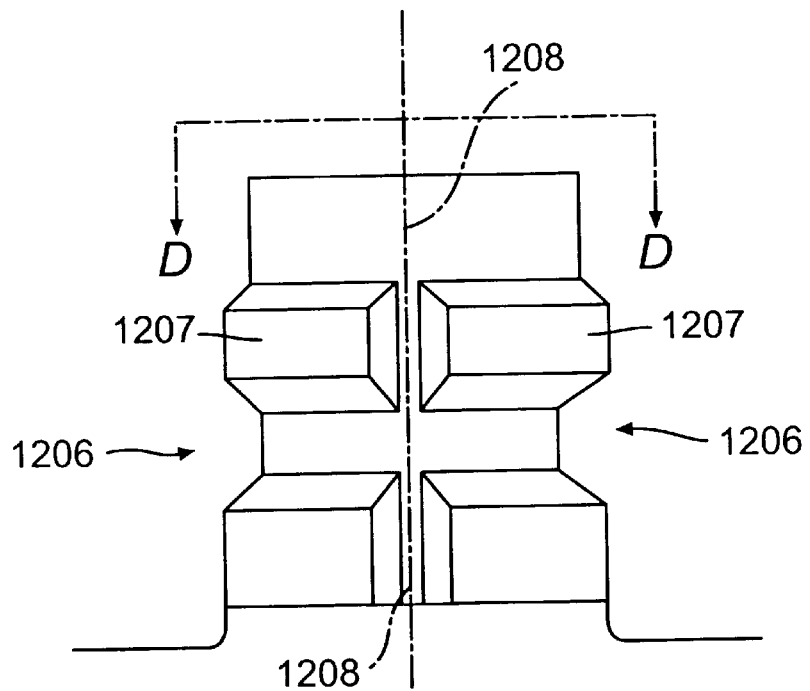
FIG. 18 is a side view of a plug.
Figure 19:
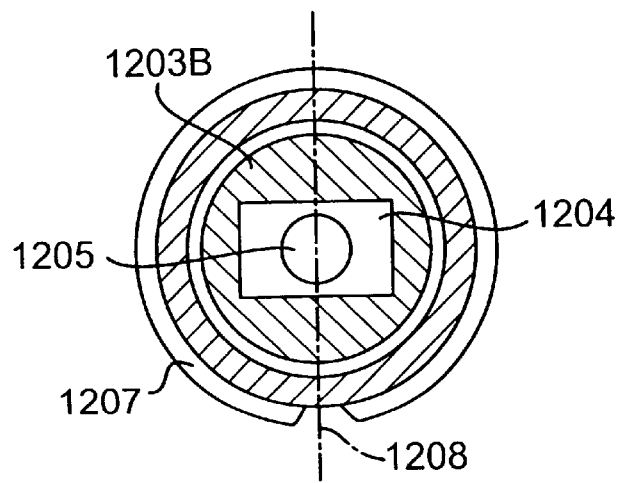
FIG. 19 is a view along the line D—D in FIG. 18.
Figure 20:
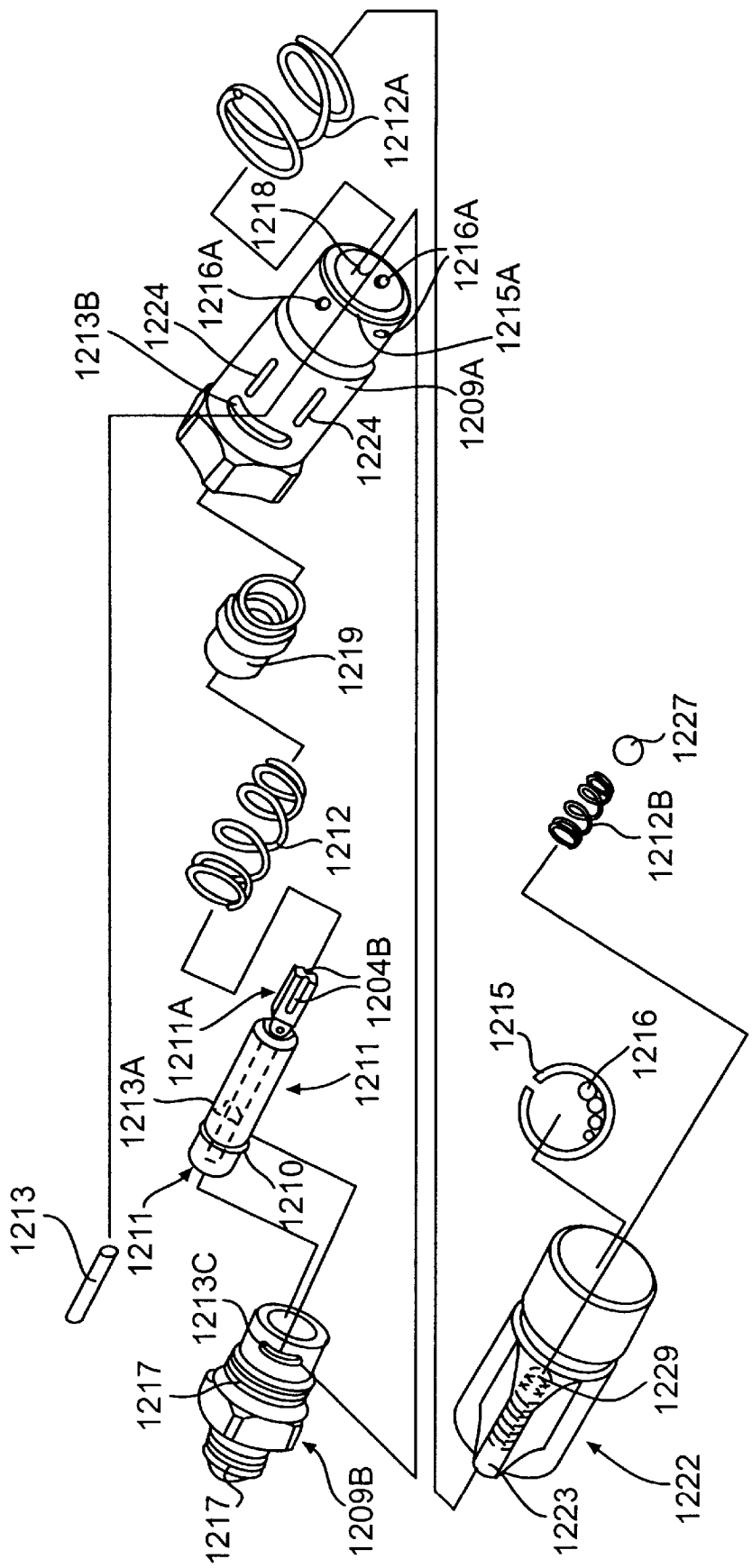
FIG. 20 is a diagram illustrating the socket unit according to the embodiment 7 in a disassembled state.
Figure 21:
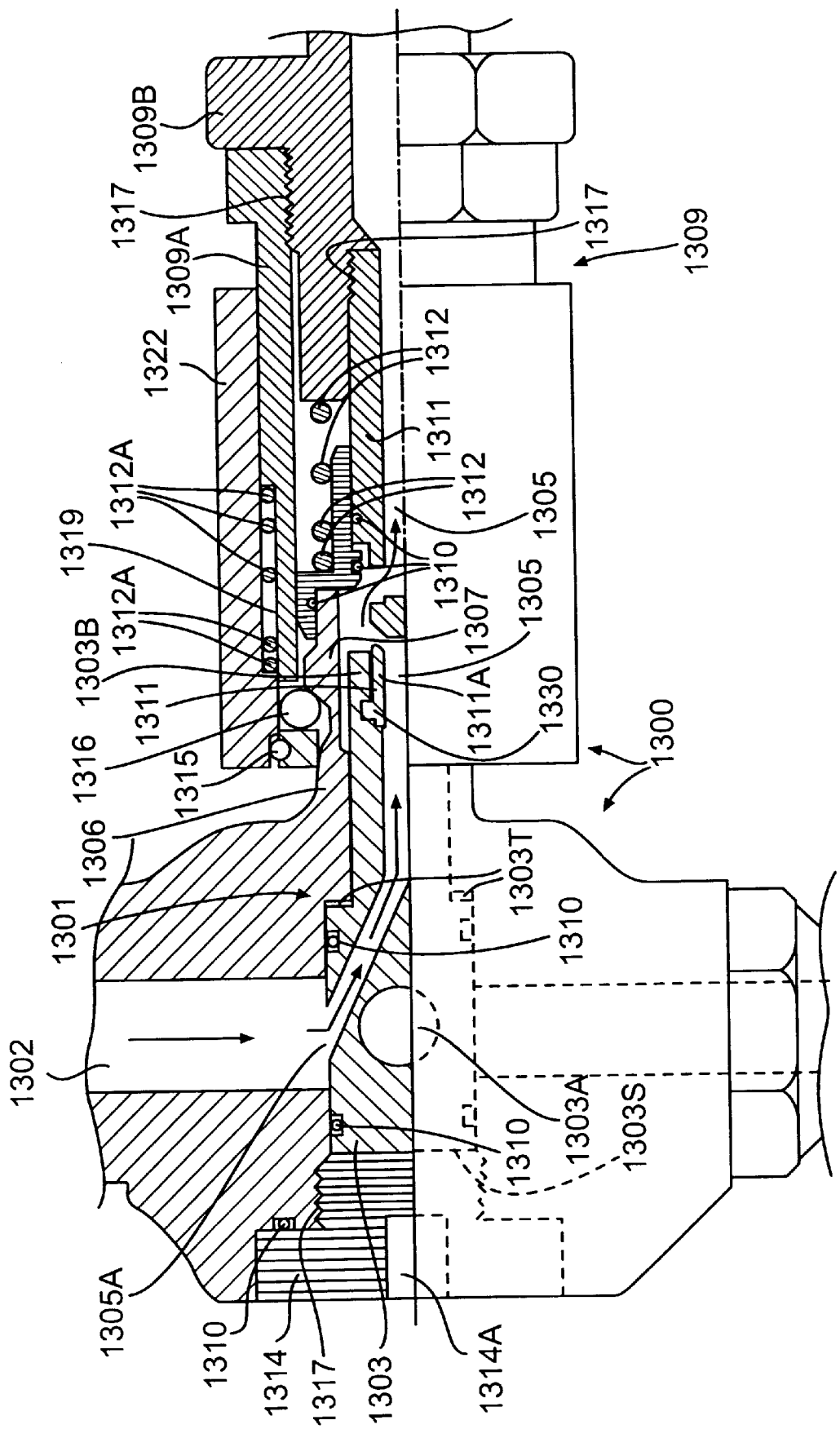
FIG. 21 is a sectional view illustrating a portion of an embodiment 8 (depressed ON-OFF type) of when the fluid is to be recovered.
Figure 22:
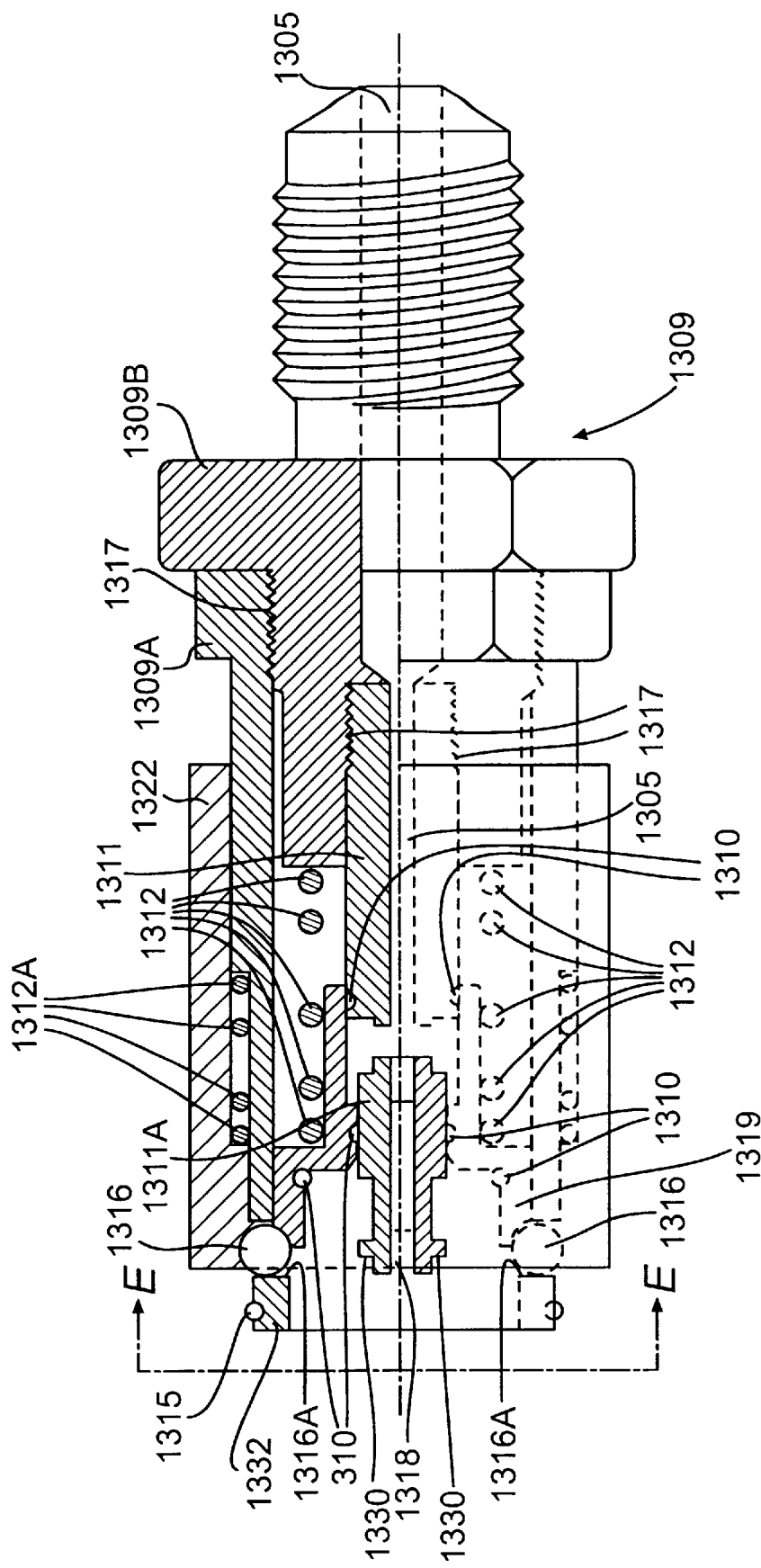
FIG. 22 is a sectional view illustrating a portion of the socket according to the embodiment 8 (normal state)
Figure 23:
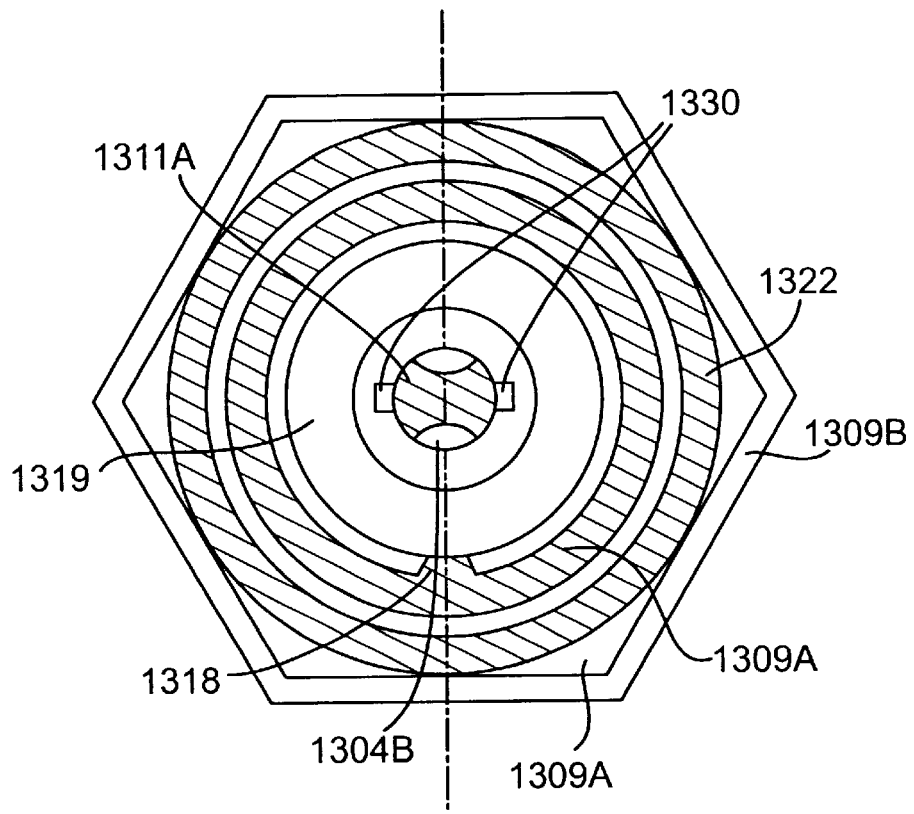
FIG. 23 is a view along the arrow E—E in FIG. 22
Figure 24:
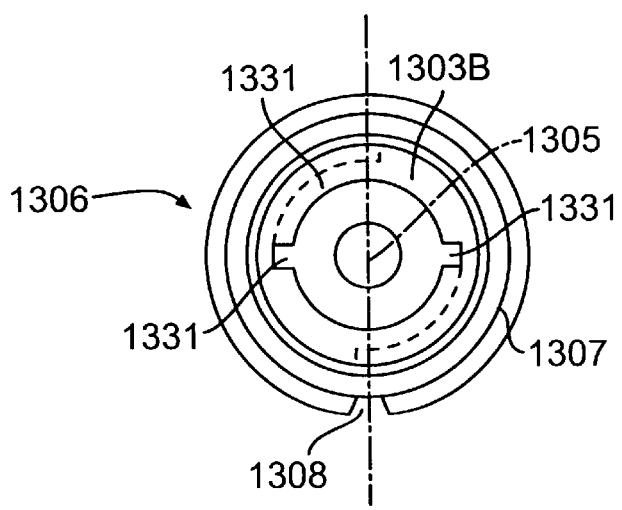
FIG. 24 is a side view of the plug according to the embodiment 8.
Figure 25:
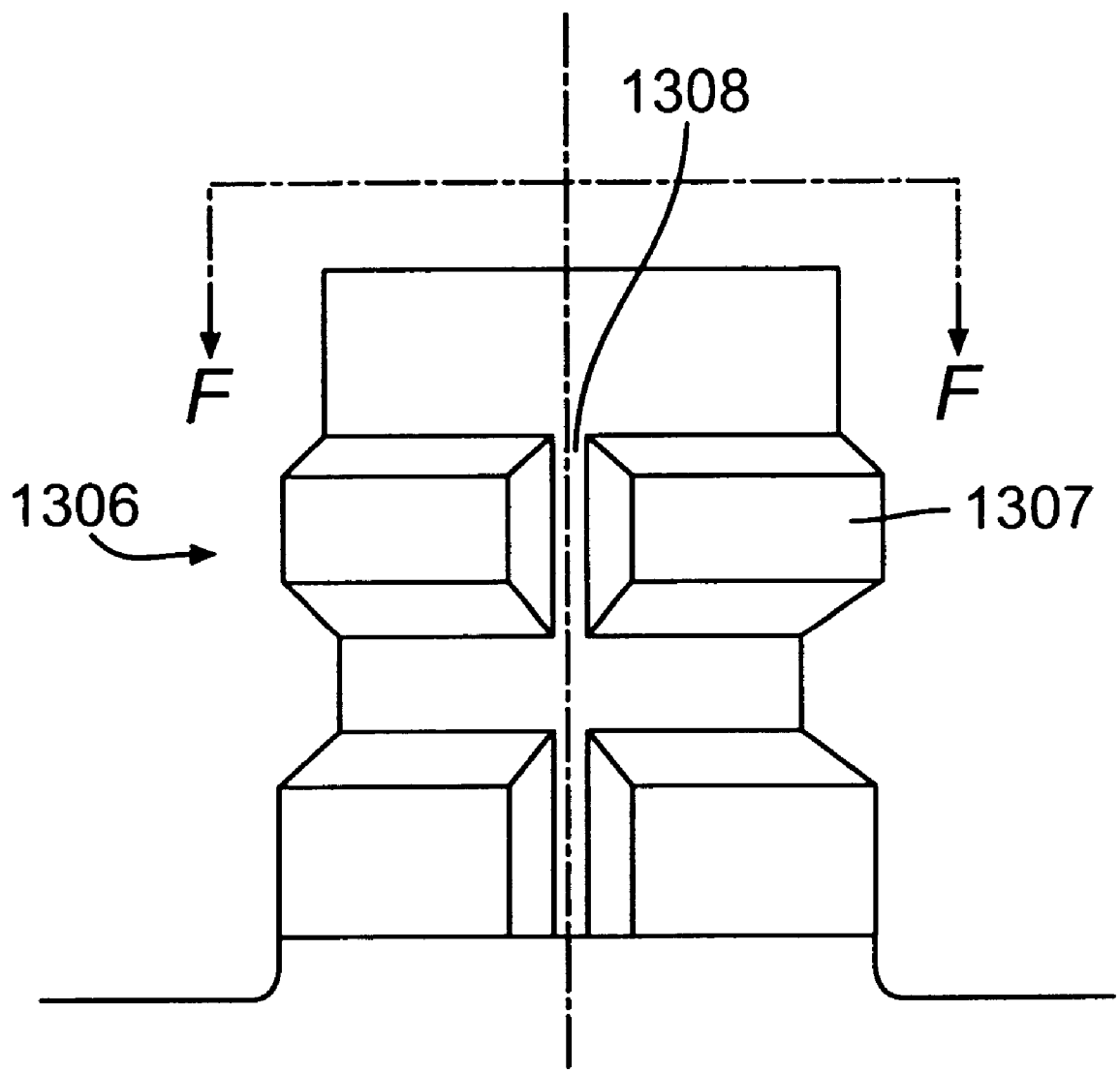
FIG. 25 is a view along the line F—F in FIG. 25.
Figure 26:
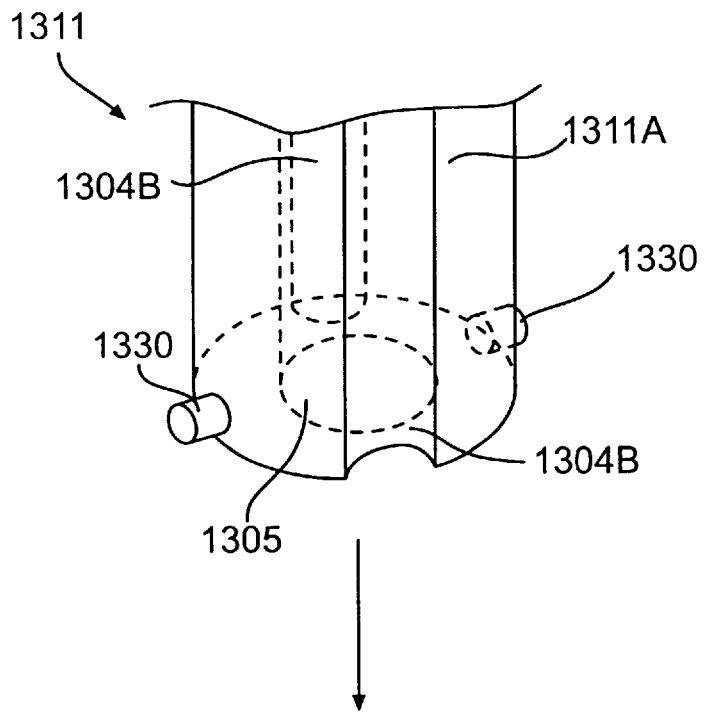
FIG. 26 is a perspective view of a valve-depressing shaft and an upper part of the valve according to the embodiment 8.
Figure 26:
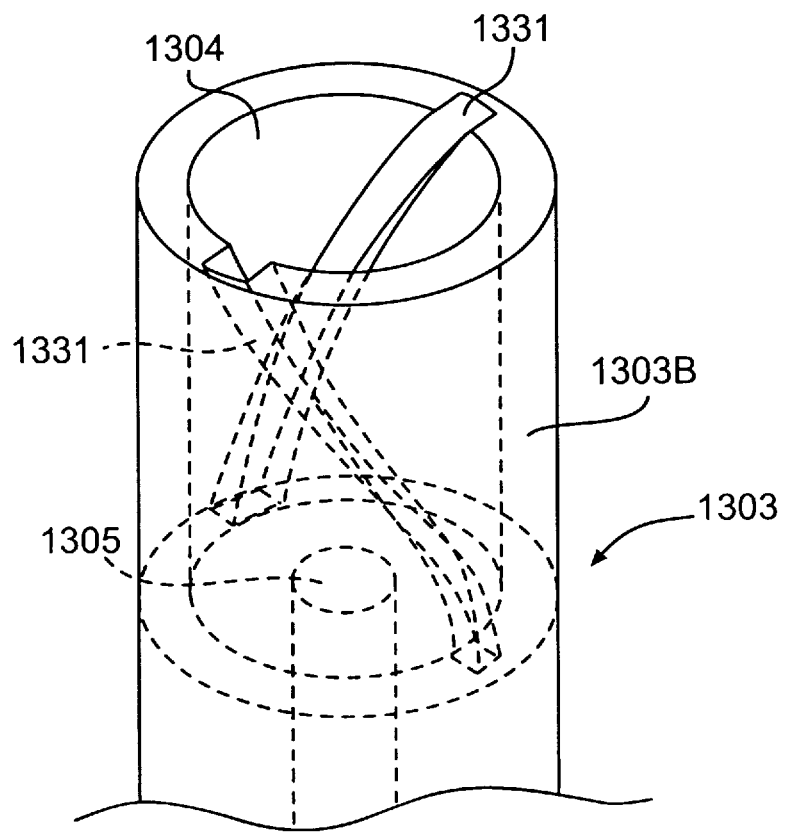
Figure 27:
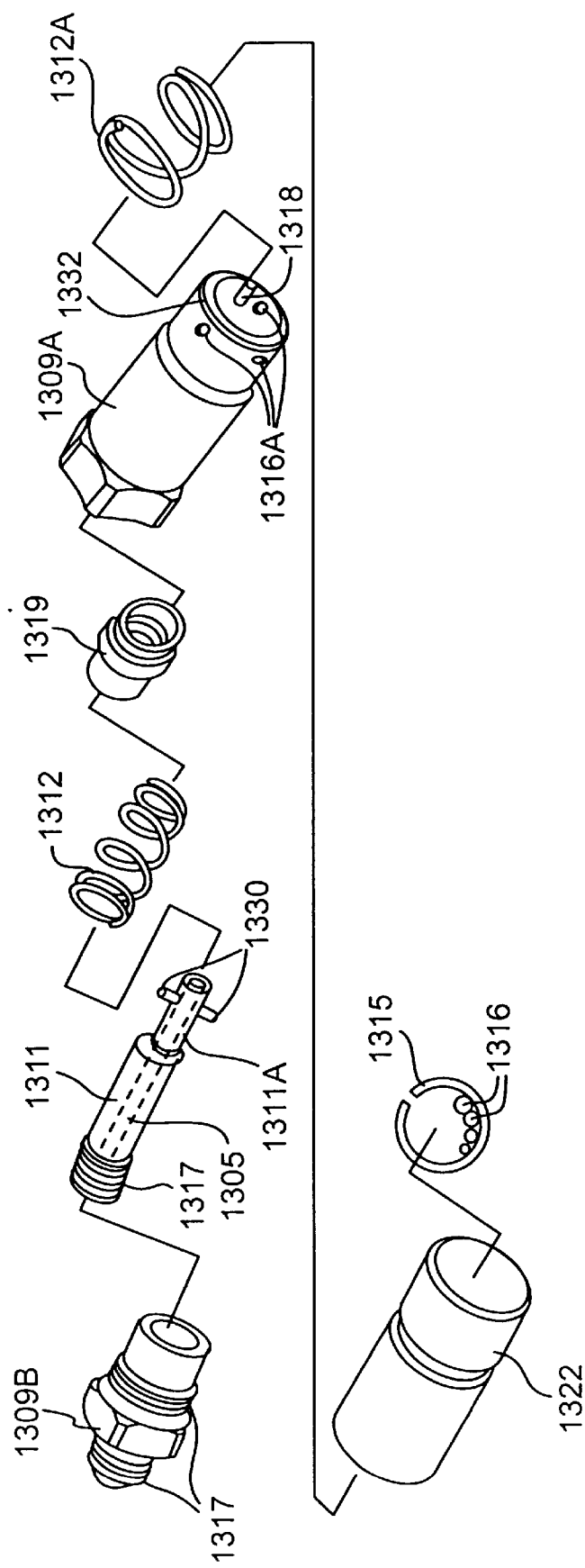
FIG. 27 is a view of the socket according to the embodiment 8 in a disassembled state.

FIG. 7 is a sectional view of an embodiment 6 (ON-OFF type) of when the fluid is to be recovered, FIG. 8 is a sectional view of the embodiment 6 during the normal state, FIG. 9 is a view along the arrow A—A in FIG. 8, FIG. 10 is a view along the line B—B in FIG. 8, FIG. 11 is a view of a socket in a disassembled state, FIG. 12 is a sectional view illustrating a portion of an embodiment 7 (proportional control type) of when the fluid is to be recovered, FIG. 13 is a sectional view illustrating a portion of the embodiment 7 (proportional control type), FIG. 14 is a sectional view illustrating a portion of the socket which is part of the embodiment 7 of when the fluid is to be recovered, FIG. 15 is a sectional view illustrating a portion of the socket of when it is normally placed (before being inserted) according to the embodiment 7, FIG. 16 is a view along the line C—C in FIG. 15, FIG. 17 is a sectional view illustrating a portion of the socket of the embodiment 7 of when it is being fitted, FIG. 18 is a side view of a plug, FIG. 19 is a view along the line D—D in FIG. 18, FIG. 20 is a diagram illustrating the socket unit according to the embodiment 7 in a disassembled state, FIG. 21 is a sectional view illustrating a portion of an embodiment 8 (depressed ON-OFF type) of when the fluid is to be recovered, FIG. 22 is a sectional view illustrating a portion of the socket according to the embodiment 8 (normal state), FIG. 23 is a view along the arrow E—E in FIG. 22, FIG. 24 is a side view of the plug according to the embodiment 8, FIG. 25 is a view along the line F—F in FIG. 25, FIG. 26 is a perspective view of a valve-depressing shaft and an upper part of the valve according to the embodiment 8, FIG. 27 is a view of the socket according to the embodiment 8 in a disassembled state, and FIG. 28 is a sectional view illustrating a portion of an embodiment 9 (safety by-pass).

In FIGS. 7 to 28, reference numeral 1100 denotes an embodiment 6, reference numeral 1200 denotes an embodiment 7, reference numeral 1300 denotes an embodiment 8, reference numeral 1400 denotes an embodiment 9, reference numerals 1101, 1201, 1301 denote valves units (valve boxes), reference numerals 1102A, 1102B, 1202A, 1202B, 1302A, 1302B, 1402A and 1402B denote normal fluid passages, reference numerals 1103, 1203, 1303 and 1403 denote valves, reference numerals 1103A, 1203A, 1303A and 1403A denote normal passages of valves, reference numerals 1103B, 1203B, 1303B and 1403B denote upper parts of valves, reference numerals 1104, 1204 and 1304 denote valve-turning socket holes, reference numerals 1104B, 1204B and 1304B denote fluid escape grooves, reference numerals 1105, 1205 and 1305 denote fluid recovery passages, reference numerals 1105A, 1205A and 1305A denote inlet ports of fluid recovery circuits, reference numerals 1105B, 1105C, 1205B, 1205C, 1305B and 1305C denote fluid recovery passages, reference numerals 1106, 1206 and 1306 denote plugs of coupler units, reference numerals 1207 and 1307 denote annular engaging protuberances of the plugs, reference numerals 1208 and 1308 denote positioning notches, reference numerals 1109, 1209 and 1309 denote sockets of coupler units, reference numerals 1109A, 1209A and 1309A denote socket outers of coupler units, reference numerals 1109B, 1209B and 1309B denote socket inners of coupler units, reference numerals 1110, 1210 and 1310 denote O-rings, reference numerals 1111 and 1211 denote coupling shafts, 1311 denotes a depressing shaft, reference numerals 1111A and 1211A denote lower ends of coupling shafts, 1311A denotes a lower end of depressing shaft, reference numerals 1112, 1212, 1312 and 1412 denote coil springs for valves, 1212A and 1312A denote coil springs for sleeves, 1212B denotes a coil spring for opening/closing the locking balls, 1213 denotes a coupling pin, 1213A denotes a coupling pin hole, 1213B and 1213C denote elongated coupling pin holes, reference numerals 1114, 1214 and 1314 denote threaded closures at the lower ends of valve units, 1215 and 1315 denote stop rings, 1216 and 1316 denote locking balls, 1216A and 1316A denote locking ball holes, reference numerals 1117, 1217 and 1317 denote threaded portions, 1218 and 1318 denote positioning protuberances, reference numerals 1119, 1219 and 1319 denote check valves, 1220 a rod-like positioning protuberance, 1221 a positioning recessed portion, 1222 and 1322 denote sleeves, 1223 a grip of sleeve, 1224 an opening/closing lock groove, 1225 a flow rate scale, 1226 a flow rate scale reading mark, 1227 a locking ball for locking/unlocking, 1228 a coupling pin hole of sleeve, 1229 a hole for locking ball in the grip of sleeve, 1330 a protuberance that slides along a spiral groove at the upper part of the valve (secured to the lower part 1311A of the coupling shaft), 1331 a spiral groove, 1215A and 1315A denote stop ring grooves, 1140 an engaging protuberance for positioning, 1140A an L-shaped engaging groove for positioning, 1441 a pressure switch, 1442 a safety valve, and reference numeral 1443 denotes a by-pass.

The embodiments will now be described in detail.

Embodiment 6

FIGS. 7 and 8 illustrate an embodiment 6, wherein a valve unit (valve box) 1101 is provided between the normal fluid passages 1102A and 1102B. As required, the socket 1109 of the coupler unit is coupled to the plug 1106 and is turned from the outer side by about 90 degrees by hand or by using a tool, in order to change the passage of the fluid (e.g., gaseous/liquid coolant) flowing from the left side, and to guide it to an upper fluid recovery circuit, thereby to recover the pressurized fluid in the system.

The constitution is as described below.

The valve unit 1101 is threaded on both sides thereof as designated at 1117, 1117, and a normal fluid circuit (pipe) is connected thereto to flow the fluid from the left toward the right. A cylindrical cavity in formed in the valve unit 1101, and a valve 1103 is rotatably (slidably) inserted therein, the valve 1103 having the shape of a long-necked solid bottle with a thickness of an inverted T-shape in cross section.

At the lower part of the cylindrical cavity, a threaded closure 1114 at the lower end of the valve is screwed into the threaded portion 117 via an O-ring 1110.

Two O-rings 1110, 1110 are fitted to the lower part of the valve 1103 on the upper and lower sides of the normal fluid circuit 1102A–1102B, and the fluid is air-/liquid-tightly maintained in the up-and-down direction.

A normal passage 1103A is perforated at the central portion in the lower part of the valve 1103, and is usually in parallel with the normal fluid passage 1102A–1102B in the valve box 1101 to permit the flow of the fluid without resistance (see FIG. 2). Upon fitting the socket 1109 to the plug 1106 of the coupler unit to turn it as required, however, the normal fluid passage is shut off and, at the same time, the flow passage is changed over so that the pressurized fluid is upwardly guided through another fluid recovery inlet port 1105A perforated in the valve 1103 and that the fluid can be recovered through the fluid recovery passage 1105B.

The upper part of the valve and the coupler unit will now be described in detail.

The upper part 1103B of the valve is a cylinder integral with the lower part of the valve rotatably (slidably) inserted in the inner cylinder in the upper part of the valve unit. The fluid recovery passage 1105B is upwardly extending at the central portion. The upper part of the valve unit 1101 in forming a plug 1106 of the coupler unit, and fits to the socket 1109 of the coupler unit that is inserted from the upper side.

The coupler unit includes a plug 1106 (1206, 1306) and a socket 1109 (1209, 1309).

The plug 1106 at the upper part of the valve unit 1101 has a cylindrical shape as shown in FIGS. 8 and 9, and is threaded along the inner diameter at the upper end thereof as designated at 1117 so that a cap can be screwed therein, and has a slightly smaller outer diameter. The upper end of the valve body 1103 is on a level close to the lower end of the threaded portion 1117. The fluid recovery passage at the center having a diameter slightly larger than the inner diameter of the fluid recovery passage is exposed as a valve-turning socket hole 1104 which is a square hole as viewed on a plan view.

The valve-turning socket hole 1104 and the lower end 1111A of the coupling shaft 1111 inserted therein has a relationship of lock and key, and the opposite relationship is also allowable (see claim 1).

The check valve 1119 in the socket shown in FIGS. 7 and 8 is urged by the valve coil spring 1112 so as to push down the upper end of the plug located on the lower side. O-rings 1110, 1110 and 1110 are so arranged that air-tightness/liquid-tightness is maintained between the outer periphery of the upper end of the plug and the coupling shaft 1111.

The check valve 1119 works to prevent the leakage of the fluid in the fluid recovery circuit 1105C to the external side when the socket 1109 is separated away from the plug 1106 (see FIG. 8). At this mount, the gap between the check valve 1119 and the coupling shaft 1111 is closed by the two O-rings 1110, 1110. When the socket 1109 is pushed onto the plug 1106, the check valve 1119 rises against the urging force of the valve coil spring 1112, and the fluid recovery circuit 1105B in the valve is communicated with the fluid recovery circuit 1105C in the socket (see FIG. 7).

The upper end of the coupling shaft 1111 is threaded as designated at 1117 and meshes with the inner threaded portion 1117 of the socket inner 1109. The socket inner 1109B is in mesh at its another outer threaded portion 1117 with the inner diameter of the socket outer 1109A. The upper end of the socket outer 1109A is connected to the fluid recovery passage that is threaded along its outer periphery as designated at 1117. Among these threaded portions, a strong adhesive is applied to the threaded junction portion between the coupling shaft 1111 and the socket inner 1109 and between the socket inner 1109B and the socket outer 1109A prior to joining them together. After fastened, the threaded portion when it is a right-handed screw is particularly strongly secured when the socket is turned clockwise as the thrust of the shoulder ends comes into a halt. When the socket is turned counterclockwise, too, the junction portion is strongly secured due to the frictional force of the threaded portions and the adhering force of the adhesive. These members are thus integrated together and can be turned forward and reverse.

The positioning protuberance 1140 on the inner surface of the socket 1109 is fitted along the L-shaped positioning groove 1140A in the outer surface of the plug 1106 shown in FIGS. 9 and 10. That is, the socket 1109 is once pushed down against the urging force of the valve coil spring 1112 so that the lower end 1111A of the coupling shaft is fitted into the valve-turning socket hole 1104 of the upper part 1103B of the valve, and the socket 1109 is turned by about 90 degrees (desirably from about 45 to about 90 degrees) so that the valve 1103 is turned so as to be shifted from the state shown in FIG. 8 to the state shown in FIG. 7. At this moment, the positioning protuberance 1140 is anchored at the end of the L-shaped positioning groove that is slightly recessed upward being urged by the valve coil spring 1112. The L-shaped grooves may be formed in a plural number in the outer periphery of the plug maintaining a distance of 120 degrees to 180 degrees to accomplish improved anchored state of the socket and to decrease the leakage.

Here, the normal fluid passage 1102A–1102B is closed, and the fluid flowing from the left side goes up through the fluid recovery circuit inlet port 1105A and the fluid recovery circuit 1105B. The fluid then passes through the pair of fluid escape grooves 104B formed in the lower end 111A of the coupling shaft inserted in the valve-turning socket hole as described earlier, and flows upward to the upper end of the socket. In the case of this embodiment 1, the ON and OFF are changed over, and no consideration has been given to the intermediate proportional control. That is, the normal fluid passage is fully opened/fully closed, and the fluid recovery circuit is fully closed/fully opened corresponding thereto.

The valve-turning socket 1104 and the lower end 1111A of the coupling shaft fitted thereto clearly shown in FIGS. 9 and 10 may have such shapes as to transmit the torque and may be equipped with the fluid escape grooves 1104B. Therefore, they are not limited to square shapes shown in the plan view of FIG. 4, but may have a figure with spline, a polygonal shape such as pentagon or hexagon, or may have an elliptic shape.

FIG. 11 is a view illustrating the socket of the embodiment 6 in a disassembled state, from which the structure of the embodiment 6 can be easily understood.

Embodiment 7

An embodiment 7 has a basic structure that resembles the embodiment 6, but is of the proportional control type which is different from the ON-OFF type of the embodiment 6. As shown in FIGS. 12 to 15, the proportional control is executed via a coupling pin 1213 which couples the coupling shaft 1211 which is the innermost core to the sleeve grip 1223 of the outermost circumference in the radial direction.

That is, the sleeve grip 1223 is twisted to turn the sleeve 1222. The coupling pin 1213 rotates in the circumferential direction in the holes 1213B and 1213C which are elongated in the circumferential direction of the socket outer 1209A, and the coupling shaft 1211 which is the inner core is turned by the same angle (see FIGS. 15 and 20). The inner surface at the upper part of the sleeve 1222 is vertically splined, and is contacted to the outer end of the coupling pin 1213 to slide up and down and to transmit torque thereto. As described above, therefore, the coupling shaft 1211 can be turned by the turn of the sleeve irrespective of the motion of the sleeve 1222 in the up-and-down direction.

In the case of the embodiment 7, the socket 1209 has a sleeve 1222 on the outer side and is equipped with a locking ball-fitted connector having a plurality of locking balls 1216 at the lower portion.

Referring to FIGS. 17 and 18, the plug of the opposing side has an annular engaging protuberance 1207 and a positioning notch 1208. To insert the socket 1209 in the plug 1206, therefore, the positioning protuberance 1218 on the inner diameter of the socket outer 1209A must be pushed down along the positioning notch 1208 of the plug.

As this moment as shown in FIGS. 14 and 15, the check valve 1219 that is downwardly urged by the coil spring 1212 rises at the upper end of the annular plug, and the locking balls are pushed out in the radial direction. Therefore, the socket 1209 descends exceeding the protuberance 1207 of the plug 1206 (see FIGS. 17 and 12). As a result, the locking balls 1216 fitted to the locking ball hole 1216A engage with the lower surface of the annular protuberance 1207 of the plug, and are not removed.

In the state shown in FIG. 15, the check valve 1219 is pushed up from the lower side, the sleeve 1222 is lowered, and the socket 1209 is fitted to the plug 1206. In FIG. 15, however, the socket 1209 is not fitted to the plug 1206. In order for the socket 1209 to be fitted to the plug 1206, the sleeve 1222 must be once raised, i.e., the positioning protuberance 1220 must arrive at the bottom of the positioning recessed portion 1221. Otherwise, the locking balls 1216 exceed the annular protuberance 1207 of the plug as shown in FIG. 17, and are not fitted as shown in FIG. 12. This is to maintain in flush the lower end of the socket and the lower end of the sleeve which have been separated, in order to maintain a favorably placed condition. FIG. 15 illustrates this state.

The sleeve 1222 is limited by the downwardly urging coil spring 1212A, by the rod-like positioning protuberance 1220 and by the stop ring 1215 fitted to the annular groove 1215A at the lower end of the socket outer 1209A. The sleeve 1222 is allowed to be raised only when the rod-like positioning protuberance 1220 is fitted to the positioning recessed portion 1221 by turning the sleeve 1222.

At this moment as shown in FIG. 13, the fluid usually flows straight from the left side toward the right side. When the grip 1223 of the sleeve 1222 is turned by hand, the valve 1208 is turned by a maximum of about 90 degrees, whereby the normal fluid circuit 1202 is closed as shown in FIG. 12, the fluid recovery circuit 1205A is opened, and the fluid all flows into the upper fluid recovery circuit 1205 and is recovered by a separate tank. At this moment, the opening degree of the fluid recovery circuit inlet port 1205A can be adjusted depending upon the rotational angle of the sleeve 1222. Depending upon the design, furthermore, both the inlet port 1203A of the normal fluid circuit in the valve 1203 and the inlet port 1205A of the fluid recovery circuit can be exposed to the normal fluid passage side 1202A at an intermediate angle (e.g., valve rotational angle of about 45 degrees).

At the time of removing the socket from the plug, furthermore, the valve 1203 is necessarily in parallel with the normal fluid circuit 1202 due to the above-mentioned constitution, and the fluid is not undesirably discharged out of the system. The coil springs 122B and the balls 1227 inserted in the pair of grips 1223 and 1223 constitute a so-called click-stop mechanism like a manual F-stop mechanism of a camera in relation to recessed portions formed in the outer circumference of the socket outer 1209A, that is not shown, making it possible to easily select any valve opening degree, such as fluid recovery circuit 0 (fully closed), ¼, ½, ¾, 1 (fully opened).

Embodiment 8

An embodiment 8 mechanically resembles the embodiment 7 and copes with such a situation where it is difficult, due to the circuit structure, to turn the socket of the coupler unit for recovering the fluid. In the embodiment 8, the valve is turned by only pushing and pulling the socket by using a spiral groove and a protuberance that engages with the spiral groove.

Since it is difficult to select and fix the intermediate state but to pull and push because of the structure, the embodiment 8 is based on the ON-OFF control like the embodiment 6. In the embodiments 6 and 8, however, the proportional control can be easily accomplished relying on the combination with a screw mechanism. This, however, is not so much meaningful since the embodiment 8 tends to become complex.

The embodiment 8 will now be described in detail.

In the embodiment 8, the valve 1303 is turned by pushing and pulling the socket 1309. In FIG. 21, therefore, it is desired to provide a thrust bearing such as a needle roller bearing between the lower part of the valve an the upper surface 1303S of the threaded closure 1314 and/or between the shoulder portion of the valve and the valve box 1303T.

Most characteristically in the embodiment 8, a pair of protuberances 1330 and 1330 are attached to the outer periphery of the lower end 1311A of the coupling shaft that moves up and down along the spline but does not rotate. These protuberances 1330 and 1330 are engaged with a pair of spiral grooves 1331 and 1331 formed in the surface of the cylindrical upper part 1303B of the valve, the valve 1303 is turned via the coupling shaft 1311 upon moving the socket 1309 up and down by hand, in order to accomplish the function of the three-way valve similar to those of the embodiments 6, 7 and 8 (see FIGS. 26 and 27). In FIG. 23, reference numeral 1318 denotes a protuberance inwardly protruded in the socket, which engages with the notch 1308 of the side of the plug of FIG. 24 so as to secure the socket. Other respects are the same as those of the embodiments 6, 7 and 8.

Embodiment 9

FIG. 28 is a sectional view illustrating a portion of an embodiment 9. In this embodiment, the three-way valve 1401 itself may be the one used in the embodiments 6, 7 and 8 or may be any other one. In this embodiment, a safety measure is taken in case the three-way valve does not work to a sufficient degree. That is, the fluid flows through the normal fluid circuit 1402A–1402B. In case the three-way valve 140a malfunctions, the valve 1442A downwardly pushed by the valve spring 1412 in the safety valve 1442 is opened when the pressure reaches a dangerous level, so that the pressurized fluid is released into the normal fluid circuit 402B on the outlet side through a by-pass 1443. At the same time, as required, the power source circuit for the compressor in the refrigerator circuit is broken by a pressure switch 1441 through a relay circuit. The operation pressure A of the safety valve 1442 and the operation pressure B of the pressure switch 1441 are usually set to be B≦A. This is because a predetermined time constant is required for halting the compressor. It is desired to provide both the safety valve 1442 and the pressure switch 1441. However, either one of them may often suffice for the need provided the sensitivity and time constant are designed well.

(1) The above-mentioned objects are all accomplished by carrying out the present invention (claims 1 to 10).

That is, there are provided a method of recovering a coolant at a low cost and highly efficiently and an apparatus therefor by utilizing the refrigerator circuit of the apparatus from which the coolant is to be recovered such as a car or an apparatus which is out of service, in order to voluntarily recover the coolant by driving only the compressor in the apparatus from which the coolant is to be recovered.

When the apparatus from which the coolant is to be recovered is an automobile, the fuel remaining in the fuel tank of the vehicle from which the coolant is to be recovered is burned as efficiently as possible to enhance safety after the recovery and to lessen contamination to the environment.

There is further provided a tool for piercing and shutting off the coolant pipe, which is very effective in carrying out the method of recovering a coolant of the present invention and makes it possible to enhance the operation efficiency and safety.

(2) The above-mentioned objects are all accomplished by carrying out the invention (claims 11 to 16).

That is, there is provided a three-way valve for recovering a pressurized fluid comprising a valve unit and a coupler unit, and having a function for opening the three-way valve unit to the recovery circuit simultaneously with the connection of the coupler unit to the recovery circuit.

At the time of recovering the pressurized fluid such as coolant, the pressure does not suddenly increase despite the compressor is not readily halted, and the pressurized fluid is safely recovered through the recovery circuit out of the system.

It is allowed to quickly recover the pressurized fluid safely, reliably and in a foolproof manner.

What is claimed is:

1. A method of recovering a coolant in a refrigerator circuit, the method comprising the steps of: driving a compressor in the refrigerator circuit; shutting off a passage between a condenser and a high-pressure outlet port of the compressor in the refrigerator circuit; and connecting a recovery conduit connected to the passage near the high-pressure outlet port of the compressor between the shut-off point and the compressor to a coolant recovery tank through the condenser to recover the coolant.

2. A method of recovering a coolant according to claim 1, wherein the coolant is liquefied through the condenser that utilizes gravity, and the liquefied coolant is downwardly moved and collected by utilizing the gravity and vibration into the coolant recovery tank.

3. An apparatus for recovering a coolant in a refrigerator circuit by using a compressor having a high-pressure outlet port in the refrigerator circuit the apparatus comprising:

a recover pipe for connection to a passage near the high-pressure outlet port of said compressor; a passage-shut-off device having a shield portion for shutting off the passage leading to a condenser while recovering the coolant; and a coolant recovery tank connected to the recovery pipe through the condenser that utilizes gravity.

4. An apparatus for recovering a coolant according to claim 3, wherein said condenser that utilizes gravity is constituted by a round and/or square spiral or zig-zag pipe having a small flow resistance and being downwardly inclined.

5. An apparatus for recovering a coolant according to claim 3, wherein the condenser utilizing gravity is constituted by a pipe having fins and is equipped with a fan for forced air cooling.

6. An apparatus for recovering a coolant according to claim 3, wherein the condenser utilizing gravity is of the water-cooled type using a water jacket or a cooling tower.

7. An apparatus for recovering a coolant according to claim 3, wherein the condenser utilizing gravity is equipped with a vibration device for vibrating part or whole thereof.

8. An apparatus for recovering a coolant according to claim 3, wherein the coolant recovery tank is of the water-cooled type.

9. The apparatus for recovering a coolant according to claim 3, further comprising a pipe piercing/shutting-off tool used for the high-pressure outlet port of the compressor in the refrigerator circuit from which the coolant is to be recovered, the pipe piercing/shutting-off tool having a piercing portion having a sharp blade-like open edge for piercing a hole for recovering the coolant by being pushed into the pipe in nearly the radial direction thereof, and a pressurized shut-off portion for shutting off the refrigerator circuit at a portion on the downstream side of the pierced portion simultaneously with the piercing.

10. The apparatus for recovering a coolant according to claim 9, wherein the moving power is produced by a hydraulic pressure cylinder.

11. A three-way valve for recovering a pressurized fluid, comprising: a valve unit; and a coupler unit coupled to the valve unit, the coupler unit having a socket and a plug, wherein one of the socket and the plug of the coupler unit is one of a lock and a key for actuating the valve of the three-way valve, and the other one of the socket and the plug is the other one of the key and the lock therefore.

12. A three-way valve for recovering a pressurized fluid according to claim 11, wherein the coupler unit has the socket connected to the circuit for recovering the pressurized fluid and the plug on the side of the valve unit.

13. A three-way valve for recovering a pressurized fluid according to claim 11, wherein the valve in the three-way valve is turned by turning either the socket or the plug of the coupler unit by a finger tip or by using an attached or a separately furnished tool key.

14. A three-way valve for recovering a pressurized fluid according to claim 11, wherein the valve in the three-way valve is turned via a spiral mechanism by utilizing a pushing force at the time of connecting the socket and the plug of the coupler unit.

15. A three-way valve for recovering a pressurized fluid according to claim 11, wherein the inlet port of the valve unit is provided with a pressure switch and/or a by-pass having a pressure valve is provided across the inlet port and the outlet port of said valve unit, as a safety device in case the recovery passage is not opened due to some cause despite the initial passage is shut off.

16. A three-way valve for recovering a pressurized fluid according to claim 11 or 15, wherein the pressurized fluid is any one of various kinds of freon gases, a coolant inclusive of ammonia gas, an operation fluid, the compressed air, LPG, LNG, liquefied nitrogen or liquefied oxygen, or is a mixture thereof.

* * * * *